(12) United States Patent
Waldvogel et al.

(10) Patent No.: US 12,296,537 B2
(45) Date of Patent: May 13, 2025

(54) METHOD FOR THE LIGHTWEIGHTING AND/OR DESIGNING OF AN ADDITIVELY MANUFACTURED ARTICLE

(71) Applicant: spherene AG, Zurich (CH)

(72) Inventors: Christian Waldvogel, Zurich (CH); Ralph Bärtschi, Zurich (CH)

(73) Assignee: spherene AG, Zürich (CH)

( * ) Notice: Subject to any disclaimer, the term of this patent is extended or adjusted under 35 U.S.C. 154(b) by 405 days.

(21) Appl. No.: 17/611,325

(22) PCT Filed: May 16, 2019

(86) PCT No.: PCT/IB2019/054076
§ 371 (c)(1),
(2) Date: Nov. 15, 2021

(87) PCT Pub. No.: WO2020/229883
PCT Pub. Date: Nov. 19, 2020

(65) Prior Publication Data
US 2022/0203621 A1 Jun. 30, 2022

(51) Int. Cl.
*B29C 64/386* (2017.01)
*B29C 64/393* (2017.01)
(Continued)

(52) U.S. Cl.
CPC .......... *B29C 64/386* (2017.08); *B29C 64/393* (2017.08); *B33Y 10/00* (2014.12);
(Continued)

(58) Field of Classification Search
CPC ....... B29C 64/386; B33Y 10/00; B33Y 50/00; G06F 30/17; G06F 30/23; G06F 2113/10
(Continued)

(56) References Cited

U.S. PATENT DOCUMENTS 9,180,010 B2 * 11/2015 Dong .................. B23K 26/342
9,463,598 B2 * 10/2016 Rockhold ............ B29C 64/106
(Continued)

FOREIGN PATENT DOCUMENTS

CN 109466065 A 3/2019
RU 2642654 C1 1/2018
(Continued)

OTHER PUBLICATIONS

N.G. De Brujin, "Algebraic theory of Pensrose's non-periodic tilings of the plane", Proceedings A 84(1), 1981, pp. 39-66, vol. 43.
(Continued)

*Primary Examiner* — Iftekhar A Khan
(74) *Attorney, Agent, or Firm* — The Webb Law Firm

(57) ABSTRACT

The present disclosure relates to a method for the lightweighting and/or designing of an additively manufactured article. The disclosure further relates to a computer program product adapted for executing the method of the present disclosure as well as an additively manufactured article obtainable by the method according to the present disclosure. The method includes the step(s) of infilling and/or building each of the one or more integral article parts with a quasi-crystalline structure. The additively manufactured article obtainable by performing the method includes a quasi-crystalline structure and/or a quasiperiodic minimal surface infill and/or quasiperiodic minimal surface design structure and/or aperiodic minimal surface design structure and/or aperiodic minimal surface infill. The disclosure further relates to a method of use of a skeleton graph for a preprocessing in an additive manufacturing process.

22 Claims, 9 Drawing Sheets

(51) Int. Cl.
  *B33Y 10/00* (2015.01)
  *B33Y 50/00* (2015.01)
  *B33Y 50/02* (2015.01)
  *B33Y 80/00* (2015.01)
  *G06F 30/17* (2020.01)
  *G06F 30/23* (2020.01)
  *G06F 113/10* (2020.01)

(52) U.S. Cl.
  CPC .............. *B33Y 50/00* (2014.12); *B33Y 50/02* (2014.12); *B33Y 80/00* (2014.12); *G06F 30/17* (2020.01); *G06F 30/23* (2020.01); *G06F 2113/10* (2020.01)

(58) Field of Classification Search
  USPC .............................................................. 703/1
  See application file for complete search history.

(56) References Cited

U.S. PATENT DOCUMENTS

| | | | |
|---|---|---|---|
| 9,646,411 B2* | 5/2017 | Lee | G06T 17/10 |
| 9,902,114 B2* | 2/2018 | Musuvathy | G06F 30/23 |
| 10,503,149 B2* | 12/2019 | Vernon | G05B 19/4099 |
| 10,882,255 B2* | 1/2021 | Kabaria | B29C 64/386 |
| 11,813,797 B2* | 11/2023 | Gonzalez Martin | B33Y 50/00 |
| 11,989,003 B2* | 5/2024 | Vernon | G05B 19/4099 |
| 12,128,607 B2* | 10/2024 | Johnson | B33Y 80/00 |
| 2006/0249875 A1 | 11/2006 | Robb et al. | |
| 2013/0313743 A1* | 11/2013 | Rockhold | B29C 64/118 425/135 |
| 2014/0014493 A1 | 1/2014 | Ryan | |
| 2016/0133049 A1* | 5/2016 | Hill | G06T 19/20 700/98 |
| 2016/0209820 A1* | 7/2016 | Banadyga | B29C 64/386 |
| 2016/0236417 A1* | 8/2016 | Rothenberg | B33Y 50/00 |
| 2016/0346999 A1* | 12/2016 | Patrov | B29C 64/106 |
| 2017/0149083 A1 | 5/2017 | Duoss et al. | |
| 2017/0228474 A1* | 8/2017 | Benjamin | G06F 30/23 |
| 2018/0009168 A1* | 1/2018 | Morovic | H04N 1/405 |
| 2018/0169954 A1* | 6/2018 | Kendrick | B33Y 50/02 |
| 2018/0370114 A1* | 12/2018 | Hopkins | B29C 64/10 |
| 2019/0054731 A1* | 2/2019 | Christian | B33Y 50/00 |
| 2019/0197773 A1* | 6/2019 | Schmidt | G06T 17/20 |
| 2020/0238625 A1* | 7/2020 | Champion | B29C 64/10 |
| 2020/0262149 A1* | 8/2020 | Zydzik | B29C 64/393 |
| 2021/0062970 A1* | 3/2021 | Pham | B33Y 50/02 |
| 2021/0370606 A1* | 12/2021 | Kim | B29C 64/386 |
| 2021/0394452 A1* | 12/2021 | Lalonde | B33Y 50/00 |

FOREIGN PATENT DOCUMENTS

| | | |
|---|---|---|
| RU | 2666444 C2 | 9/2018 |
| WO | 2017192508 A1 | 11/2017 |
| WO | 2019021011 A1 | 1/2019 |

OTHER PUBLICATIONS

Rotormind, "3D Printing Quasicrystal Shapes", 2015, pp. 1-6, [retrieved on Dec. 16, 2021]. Retrieved from the Internet <URL: https://web.archive.org/web/20190114233222/http://www.instructables.com/id/#D-Printing-Quasicrystal-Shapes/>.

Doroshenko et al., "Prospects for Computer-Aided Design of Castings", Boundary Field Problems Computer Simulation, 2014, vol. 53, pp. 3-8.

Schoen, "Infinite Periodic Minimal Surfaces Without Self-Intersections", Nasa Technical Note, 1970, 100 pages.

Yan et al., "Strong 3D Printing by TPMS Injection", IEEE Transactions on Visualization and Computer Graphics, 2020, pp. 3037-3050, vol. 26, No. 10.

Zixin, "The Lightweight of Models using Three-Periodic Minimal Surfaces", Dalian University of Technology, 2017, 33 pages.

Mazet et al., "A quasi-periodic minimal surface", 2006, pp. 1-34, Internet document reference https://www.idpoisson.fr/mazet/docu/quasi.pdf (E4).

Traizet, " Exploring the Space of Embedded Minimal Surfaces of Finite Total Curvature", Experimental Mathematics, 2008, vol. 17:2, pp. 205-221.

* cited by examiner

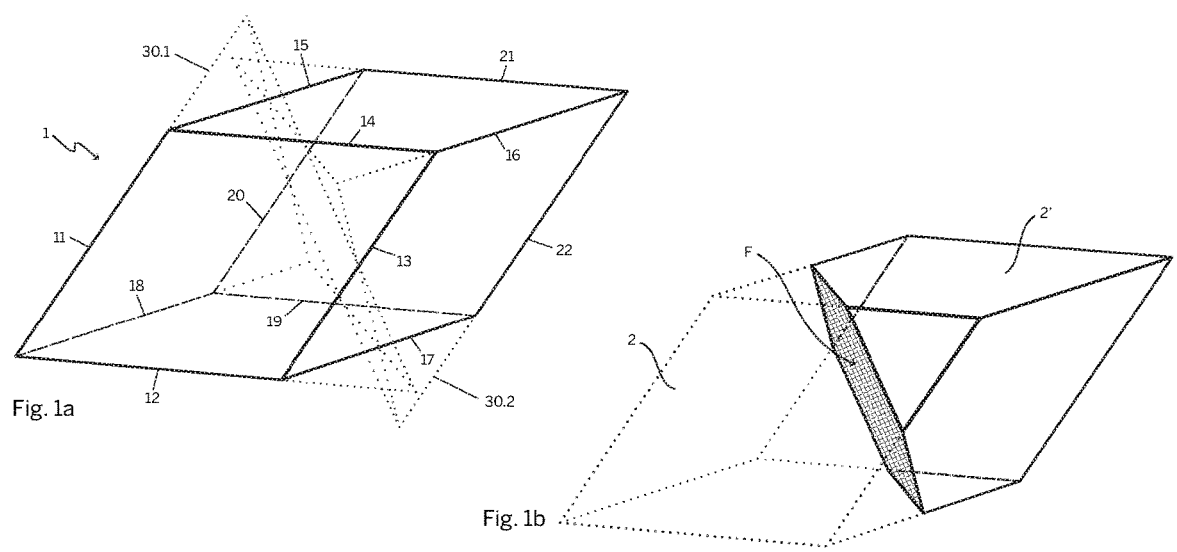
Fig. 1a
Fig. 1b
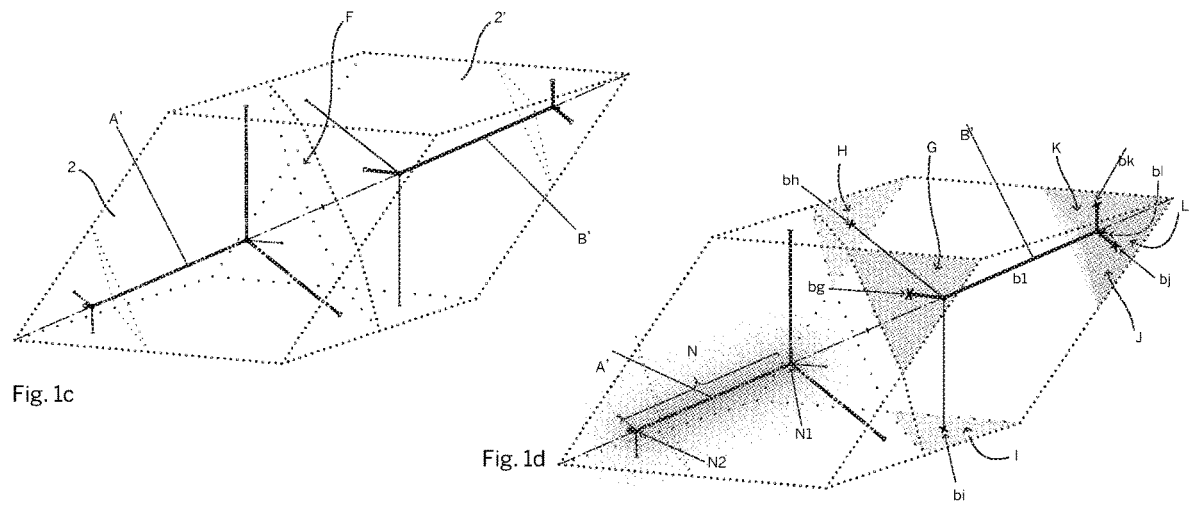
Fig. 1c
Fig. 1d
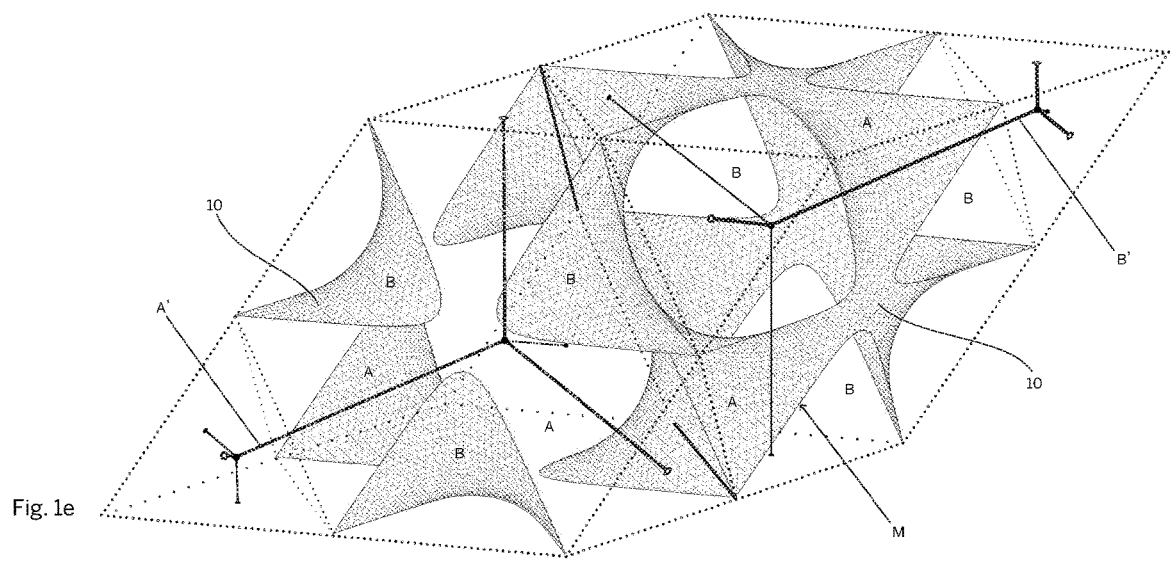
Fig. 1e

METHOD FOR THE LIGHTWEIGHTING AND/OR DESIGNING OF AN ADDITIVELY MANUFACTURED ARTICLE

CROSS-REFERENCE TO RELATED APPLICATION

This application is the United States national phase of International Application No. PCT/IB2019/054076 filed May 16, 2019, the disclosure of which is hereby incorporated by reference in its entirety.

BACKGROUND

Technical Field

The present disclosure relates to a method for the lightweighting and/or designing of an additively manufactured article. The disclosure further relates to a computer program product adapted for executing the method of the present disclosure as well as an additively manufactured article obtainable by the method according to the present disclosure.

Technical Background

The ways in which a space-filling, periodic lattice can be organized are limited to 213 general symmetry constructs called the space groups, which describe the entirety of combinatoric solutions to the problem of repeating a point in space using a series of copy operations like translations, rotations and reflections. There is, however, an exception to this rule: infinite, non-periodic structures called quasicrystals. Just like lattices represented by one of the periodic space groups, quasicrystals are formed of one, or a plurality, but not infinitely many types of fundamental cells. Because the repetition of these cells keeps producing similar (or even identical) arrangements in the small scale, which never repeat in the large scale, quasicrystals exhibit a feature called <quasiperiodicity> (rather than aperiodicity). Quasicrystals can fill («tile») space without ever repeating. While two-dimensional quasicrystalline tilings (like the well-known Penrose tiling) consist of two or more types of rhombs, three-dimensional quasicrystals are made from two or more rhomboid-shaped cells.

Two methods of creating quasicrystals are commonly used: the projection method, where a six- or more-dimensional pattern is projected into three-dimensional space, and de Bruijn's grid method, where three or more vectors in space create a series of plane families that in turn lead to the specification of the quasicrystal.

Minimal surfaces are curved, two-dimensional, space-occupying mathematical constructs which fulfil the requirement that at every point the average of two perpendicularly measured curvatures amounts to zero. Therefore, every point is defined such that if the surface is curved by a certain amount in a certain direction, then the curvature measured perpendicularly to that direction is the negative value of the first curvature. Due to the fact that minimal surfaces are the least-bent surfaces connecting a certain set of points, they constitute ideal geometries that allow for the most efficient force conduits aside from spheres and catenaries (the latter of which is a minimal surface in its own right). This makes a minimal surface ideal to distribute loads and forces inside of structures of, for example, 3D-printed parts—and, effectively, every load-bearing structure. Minimal surfaces whose fundamental cells are structured in away that they can be repeated in all directions—thus tiling infinite space—are called <triply periodic minimal surfaces> (TPMS).

Additive manufacturing («AM», «3D-printing», «Rapid Prototyping») is an umbrella term encompassing a wide range of computer-controlled production processes that allow for the physical formation of articles made from various materials. For the scope of the present disclosure additive manufacturing shall be understood to also comprise robotic assembly by parts.

Before an object can be 3D-printed, it must be defined in the form of a virtual computer model («CAD model», «3D-model»), where its geometry is represented as mathematical functions («CAD surfaces»), through coordinates of vertices, edges, faces and their interrelations describing the space enclosed by the 3D-model, or as a three-dimensional voxel matrix (<voxel> is the portmanteau that combines <volume> and <pixel>). In most of the standardized 3D-model exchange formats, object geometry is represented as a polygon mesh including or consisting of triangular and/or quadrilateral faces (coordinates and interrelations of vertices, edges and faces forming a volume). While the polygon mesh representation is highly flexible and can be used to (approximately) describe almost any shape without the need of a mathematical analysis of its geometry (which is needed when using the CAD surface representation), it is notoriously error-prone and tends to yield large data volumes and thus high network traffic and high computing load.

In most types of AM processes, an article is formed by means of consecutive, layer-wise application, or binding, or hardening, or polymerization of one or more substances. The binding, hardening or polymerization process may be induced continuously, just after application, or after each layer is finished, or at the end of the build process, or in an entirely separate process outside of the actual printer machine. The 3D-print preparation of a 3D-model thus involves converting the spatial information contained in the 3D-model ("pre-processing") into <material/no material> information packets for each layer («slices»). In most cases, slices are simple bitmap images relating to the desired print layer height, where black represents <material> and white the absence thereof. On one hand, each pixel in a slice corresponds to one minimal printing unit in a layer (depending on the characteristics of the printer machine; the minimal diameter of a laser point, laser path, etc. for example), and on the other hand, it represents one voxel in the printed article. In some cases, a slice contains additional control information relating to printer- or article-specific parameters such as laser energy or laser motion velocity, which may be different for each layer or vary within the layer.

Other actions in preprocessing include global parameter adjustments based on the characteristics of the printer machine and/or the printing process, and/or a simulation thereof, and optimizations such as weight-reduction («lightweighting«).

AM allows for the formation of highly complex articles which would be very difficult—if not impossible—to build with classical production methods. Depending on the geometry of the article, the printing method and material used, an external build support structure («build support») is needed to ascertain the correct and error-free production of the article. Some methods and/or materials do not require build supports, as they are stabilized by the medium itself while being formed. However, most methods used to form articles from metals like steel, aluminum, titanium etc. require build supports not only to ascertain error-free formation and correct geometry of the printout, but to dissipate surplus heat. The removal of the build supports during postprocessing is often laborious and, in the case when the build supports are inside or hardly accessible due to the shape of the article, almost impossible or simply not doable without damaging the object.

Therefore, the more self-supporting the article is—the less build supports are needed for a successful build process—the better. To maximize strength while minimizing weight, and because in AM complicated, <bionic> or amorphous geometries can be produced without additional cost or effort, the shape of articles is often parametrically optimized towards minimal material usage and optimal shape fulfilling the structural and geometric requirements of the article. Compared to the initial design of an article—which in some cases is <classical> monolithical—such an optimized shape often possesses holes, branches, bulges and tendons; the process leading to this shape is thus called <topological optimization>, as the topology of the article—the number of holes it possesses (its "genus")—is altered.

Such an optimization is often part of a CAE («computer-aided engineering») process, where geometric constraints, forces, stresses and motions are simulated, often using a computer method called FEM («finite element modeling»). Some articles are designed and manufactured without the need for or aid of an FEM simulation; these are most often articles that need not be optimally optimized. Articles where the strength-to-weight ratio is critical (such as in aerospace or industrial applications) on the other hand, are always engineered using FEM or similar methods. Because forces tend to flow along the surface of an object rather than through its interior, the object can, in principle, be reduced to a thin skin. Naturally, a certain material cross section needs to be retained to conduit the forces, ascertain geometric integrity, and account for the material characteristics and the stresses acting upon the article.

In some cases, the addition of an internal structure connecting the sides of the skin greatly improves overall stability, if not ascertaining the geometrical integrity of the article under stress and during the build process. However, while this hollowing out of both a <classically> shaped or topologically optimized article leads to reduced production time and cost, significant weight gains, and sometimes even improved stability, most articles are still produced in solid form. This is owed in part to the complexity of handling large polygon meshes—which are notoriously error-prone—and due to the need to ascertain the integrity of the articles' shape and geometry, which might be susceptible to distortion, both during the build process, use and/or under load, if no coherent, well-designed and well-engineered interior structure is present.

A hollowing technique commonly used is the application of <infills>, which are simple geometric lattice structures (<spatial grids>) that pad the <interior> of the article. There are, however, three main shortcomings of this technique: (1) the effective structural impact and efficiency of the infill is subject to guesswork if not studied using FEM, (2) the infill geometry per se needs to be extremely simple, as it needs to be similar to the build support structure (which can always be built without the need of further build support of course), and (3) the infill structure vastly increases the polygon count of the 3D-model (therefore also increasing computing load and response time) because it is very small-scaled compared to the 3D-model itself, but still needs to be precisely defined. Because complex and/or sophisticated infills may increase the polygon count of the 3D-model by one or several orders of magnitude, infills are usually similar to build supports: coarsely shaped, crude and thin, optimized rather for printability than structural efficiency.

There is therefore a need to provide methods and means of preprocessing additively manufactured articles that overcome at least one limitation of the known.

BRIEF SUMMARY

It is therefore an object of the present disclosure to provide a method, computer program product and additively manufactured article that overcomes at least one of the shortcomings of the state of the art. It is a particular object of the present disclosure to provide such a method, computer program product or article, that enables lightweighting and/or designing the article with superior properties in respect to at least its geometric integrity and/or load bearing structure compared to having the same article conventionally designed and/or lightweigted.

The present disclosure thus concerns the manufacture of additively manufactured articles and the preprocessing of such, wherein the article can comprise one or more integral article parts, each with an internal structure («infill») providing stability improvement, weight reduction and production assistance and/or build support.

The object of the present disclosure is solved with a method, a computer program product and an additively manufactured article according to the features of the independent claims.

One aspect of the present disclosure is a method for the lightweighting and/or designing of an additively manufactured article. The article comprises one or more integral article parts each with a structure. The method comprises at least the step of infilling and/or building each of the one or more integral article parts with a quasicrystalline structure. In a particular embodiment of the present disclosure, each or some of the one or more integral article parts comprise an internal structure, and the lightweighting concerns the designing of the internal structure such that stability, weight and production assistance, respectively build support during the additive manufacturing process is affected by the steps of the method described herein.

In one particular embodiment, the article and/or one integral part of the article essentially consists of the structure.

In the context of the present disclosure, the infilling according to the step above can be understood as a step of the lightweighting according to the present disclosure, whereas the building step above can be considered as a step of the designing of the additively manufactured article according to the present disclosure. In the context of the present disclosure, the infilling can be understood as providing an internal structure which in the finished article according to the present disclosure is at least partially, preferably essentially hidden by an outer skin of the article. By contrast, the designing is the relevant method when the structure is "open", e.g., the article is not covered by an external skin. It is evident to the skilled artisan, that a combination of both method steps can be applied for one particular article with, for instance, a plurality of integral article parts, and a finished article resulting from a method according to the present disclosure can be composed of parts which have a skin covering the infill, and article parts for which the structure is accessible from the outside, with varying degrees of in-between.

In the context of the present disclosure, a quasicrystalline structure can be understood as a structure that is ordered but not periodic, as commonly understood by the ordinary artisan in the field.

In a particular embodiment of the present disclosure, the quasicrystalline structure is a three-dimensional quasicrystal made from two or more types of cells in the shape of rhomboids.

In an alternative embodiment, the quasicrystalline structure is a three-dimensional crystal, e.g., regularly repeating units formed according to one of the space groups, meaning according to one of the 219 non-chiral or 11 chiral space groups.

In the context of the present disclosure, a cell in this shape of a rhomboid can be understood as a three-dimensional body with six lateral sides of a parallelogram geometry.

In a particular embodiment of the present disclosure, the quasicrystalline structure can be created by a projection method, for which a six- or more dimensional pattern is projected into three-dimensional space. Alternatively, or additionally, the quasicrystalline structure can be created by applying a grid method where four or more vectors in space create a series of plane families that in turn lead to a specification of the quasicrystal. Various methods for generating the quasicrystalline structure can be applied for a production of one article, for instance for different article parts, or even subsequently as a verification step.

In a particularly preferred embodiment, the grid method is based on a diagonalization according to de Bruijn (N. de Bruijn, Ned. Akad. Weten. Proc. Ser. A 43, 39 (1981); 43, 53 (1981), the disclosure of which is hereby incorporated by reference in its entirety.

In a particular embodiment of the present disclosure, the infilling and/or building each of the one or more integral article parts is an infilling and/or building with a quasiperiodic minimal surface infill and/or a quasiperiodic minimal surface design structure and/or aperiodic minimal surface design structure and/or aperiodic minimal surface infill.

In a particularly preferred embodiment, the resulting infill and/or design comprises minimal surfaces, i.e. for instance, surfaces for which at every point of the surface the average of two perpendicularly measured curvatures amounts to zero or essentially zero.

In the context of the present disclosure, essentially zero can be understood as a curvature sufficient to practically display minimal surface properties on the scale and form of the article design and/or its infill, even more particularly having a deviation from zero of up to +/−0.0005 for the average of two perpendicularly measured curvatures on the surface.

In a particularly preferred embodiment, the resulting infill and/or design comprises periodic surfaces, such as for instance three-dimensional crystal surfaces.

One of the advantages of minimal surfaces according to the present disclosure can be, that they are ideal to distribute loads and forces inside or through the structures. Furthermore, these minimal surfaces can be ideal for creating items for which large surfaces and/or surface-to-volume ratios are beneficial, such as on article parts which have applications in the field of construction, catalysis, heat exchange, batteries, etc., or any other scope for which the ratio of surface-to-volume is of importance. Without being bound to theory, the structural advantages realized can be due to the fact, that minimal surfaces are the least-bent surfaces connecting a certain set of points and thus allow a very efficient force conduit between these points.

In a particularly preferred embodiment, the method of the present disclosure is performed with an infilling and/or building with a quasiperiodic minimal surface infill and/or quasiperiodic minimal surface design structure and/or aperiodic minimal surface design structure and/or aperiodic minimal surface infill such that efficient force conduit through the article is enabled.

In a particular embodiment of the present disclosure, the method comprises the further step of using the quasicrystalline structure as a framework to generate a quasiperiodic minimal surface infill and/or a quasiperiodic minimal surface design structure. In the context of the present disclosure, the framework can be the generation of a skeleton, for instance, for defining the genus of the quasiperiodic minimal surface to be achieved. In an alternative or additional embodiment of the present disclosure, the method comprises the further step of using the quasicrystalline structure as a framework to generate an aperiodic minimal surface infill and/or an aperiodic minimal surface design structure.

In a particular embodiment of the present disclosure, the method further comprises the step of creating a geometry of a quasicrystal. This creating of a geometry of a quasicrystal can be performed, in particular, by a first step of inputting at least three primary vectors. In a further particular embodiment, the step is an inputting of 3 to 12 vectors. In the context of the present disclosure, the inputting can be understood as the selecting and/or generating the respective particular parameter in a computer program product. Such an inputting can be performed, for instance, with a digital preprocessing and/or configuring of a preprocessing associated with an additive manufacturing software and device.

In this particular embodiment, the creating a geometry of a quasicrystal can comprise, in particular, a further step of creating a number of groups of parallel planes for each of the primary vectors input. Each group of parallel planes comprises at least three planes.

In this particular embodiment, the number of groups of parallel planes is only limited by a processing power and memory of the computer system used. It has been found, though, that a number of groups of parallel planes in the range of between 3 and 1000 is particularly preferred, and in the range of between 3 and 50 is even more preferred. The number of groups of parallel planes together with the number of planes in each group can be chosen by the user and defines a "resolution" of the quasicrystal. In the context of the present disclosure, the resolution can be understood as the number of cells in a particular predefined volume of article. Without being bound to theory, the number of planes chosen by the user is under discretion of the user but might be influenced by, or required to be within, certain thresholds for certain goals or applications. For instance, a specific number of planes can be set as necessary for achieving a desired stability or because of requirements due to size constraints of the article. As mentioned, there are theoretically no limits on the upper number of planes chosen, though factually they might be limited by the calculating power of the computers used for the method. It is conceivable though, that up to 100,000 planes can be handled by adequately powerful computers.

In a particular embodiment, the number of groups of parallel planes corresponds to the number of vectors input. In a particularly preferred embodiment, the direction of the planes is defined by the vectors. Even more preferred, the direction of the planes is normal to a chosen vector. With other words, each vector can be associated with a group of parallel planes that spans an angle of 90° in respect to the vector.

In a particular embodiment of the present disclosure, the planes in one specific group of parallel planes are evenly spaced. In this context, evenly spaced shall refer to the planes in one specific group, for instance, to the distance within a group of at least three planes respective to each other. In a particularly preferred embodiment, all the planes of this one specific group are evenly spaced. This can be understood as all the planes in this particular group having the same distance in the normal direction respective to the plane relative to a precedent neighboring plane and a following neighboring plane.

In a particular embodiment of the present disclosure, the planes in one specific group of parallel planes are randomly spaced. Even more particularly, all the planes in this one specific group are randomly spaced. The random spacing can be defined at the timepoint of generation of the vectors. By inputting a vector, a number of randomly arranged planes normal to that vector can be created, for instance, each with a random distance with respect to the other planes in the same group.

In a particular embodiment of the present disclosure, the planes in one specific group of parallel planes are spaced according to a predetermined pattern. Particularly preferred, all the planes in the one specific group are then arranged in this predetermined pattern. In a particular embodiment, the spacing can be determined by the results of a particular FEM, e.g., the finite-elements method applied for designing and/or infilling the article with respect to desired properties.

In a particular embodiment of the present disclosure, at least some of the planes in one specific group of parallel planes are evenly spaced and/or some of the planes are randomly spaced and/or some of the planes are spaced according to a predetermined pattern. As previously stated, the number of planes can be chosen as a measure of resolution for the resulting geometry of the quasicrystal. In a further particular embodiment, one group of planes can be created with certain predetermined rules. In the context of this example, the predetermined rules can define, for instance, that if a number of ten planes is created in one specific group, e.g., one input vector has to have a number of ten parallel planes normal to said vector, with other words enclosing an angle of 90° between the plane and the vector, that amongst these ten planes, three planes are defined to be randomly spaced along the extension of the vector, four planes are arranged to be in an equidistant arrangement respective to each other, e.g., where each plane is followed by a consecutive plane of these four after a certain, regular distance, and the resulting three planes in this group of planes are arranged according to a pattern which can be for instance 1:3, meaning the second plane follows the first plane in a first distance and the third plane follows the second plane in a second distance that is three times as long as the first distance. It is evident for the skilled artisan that these variables can be subjected to interdependent rulings, where, for instance, a certain predetermined pattern is combined with equidistantly arranged planes, such that all three of the requirements, e.g., random, predetermined and equidistant, can be incorporated into creating a geometry of one specific quasicrystal according to the present disclosure.

In a particular embodiment of the present disclosure, the method further comprises the step of bisecting the cell(s) in the shape of a rhomboid such, that faces resulting from the bisection have a hexagonal form. In the context of the present disclosure, the bisection therefore results in an intersection that is hexagonal in shape.

In a particular embodiment, bisecting a cell in the shape of a rhomboid results in two equal monotriatruncated tetrahedra out of the cell.

A truncated tetrahedron is a regular tetrahedron with the four corners cut away. For the context of the present disclosure, the monotriatruncated tetrahedron is a novel term defined for the purpose of illustrating the present disclosure and can be understood as a tetrahedron of which only three of the four corners are cut away. Compared to the truncated tetrahedron it has seven faces instead of eight (Greek; mono=one and tria=three).

In a particular embodiment of the present disclosure, the center of gravity of the cell in the shape of a rhomboid is in the plane of intersection resulting from the bisection of the cell in the shape of a rhomboid. This face is of hexagonal form, as described above.

In a particular embodiment of the present disclosure, the bisection is performed through six edges of the cell of a rhomboid shape in question, preferably in the middle of the six segment lines in question.

In a particular embodiment of the present disclosure, the method comprises the further step of assigning each monotriatruncated tetrahedron to one of two groups, such that two labyrinths are formed out of the two groups of monotriatruncated tetrahedra. In a particular embodiment, each of the monotriatruncated tetrahedra resulting from the bisecting of a cell in the shape of a rhomboid is assigned to either one of the two groups, e.g. either to the first group of monotriatruncated tetrahedra, or the second group of monotriatruncated tetrahedra. The first group forms a first labyrinth and the second group forms a second labyrinth. Preferably, the first and the second labyrinth extend through the whole interior structure of the article and/or integral article part.

In a particular embodiment, the method of the present disclosure comprises the further step of inserting a skeleton graph into each of the types of cell in the shape of a rhomboid, in particular one skeleton graph into each monotriatruncated tetrahedron such that two interleaved skeleton graphs are created spanning the entire quasicrystal without interconnecting at any point. These skeleton graphs each extend through one of the two labyrinths formed by assigning each monotriatruncated tetrahedron to one of two groups, as described above. The skeleton graphs can be arranged inside the monotriatruncated tetrahedra in a way that extends through the surfaces of the tetrahedra into neighboring tetrahedra of the same group, such that all the skeleton graphs inside a particular group of monotriatruncated tetrahedra are connected to each other. With other words, a first skeleton graph extends through the first group of monotriatruncated tetrahedra and a second skeleton graph extends through the second group of monotriatruncated tetrahedra.

In a particular embodiment of the present disclosure, for an article with more than one integral article parts, each with a structure, the steps of selecting the number of planes is performed individually. One of the advantages of doing so, can be that it becomes possible to create areas of increased "resolution".

In a particular embodiment relating to integral article parts with an internal structure, skeleton graphs can be scaled up and/or down to create locally densified skeleton graphs and/or less dense skeleton graphs. The scaling up and/or down can be made dependent of a set of parameters, such as parameters selected from the group consisting of: three-dimensional geometry of the article, printer parameter(s), finite element simulation etc.

In the context of the present disclosure, a skeleton graph can, for instance, be formed by a plurality of trees, each tree representing a small scale graph filling one monotriatruncated tetrahedron and including or consisting of a plurality of segments. In particular, each tree comes with a mirrored partner rotated by 60 degrees along the axis of a diagonal of the rhomboid cell of the respective monotriatruncated tetrahedron.

In a particular embodiment, the scaling up and/or down can result in empty regions in integral article parts with an internal structure. Accordingly, the method can further comprise the step of filling empty regions in integral article parts with an internal structure resulting from scaling up and/or down of the skeleton graphs. This can be achieved, for instance, by extending loose ends of the skeleton graphs with further trees.

By being able to dynamically and locally adapt the geometry, density and scale of the skeleton graphs it becomes possible to create customizable and adaptive infills and/or designs. If print parameters are also taken into account, it can further become possible to make articles printable without requiring print support structures for processes previously requiring it, and/or printing high force resistant articles. These items are further characterized by a maximal interfacing surface within the given space and utilizing the least amount of material for doing so. Possible applications can be as building blocks or as structures for heat exchanges, air-conditioning, batteries, dialysis machines, other medical devices, filters, implants, nanoscale materials, metamaterials, microscale materials and metamaterials, etc. As the labyrinths create two interleaved but separated continuous internal volumes they can be used as crash resistant tanks for powders, grains, liquid and/or gaseous substances with special advantages in applications where two components are to be separately stored, e.g. before being mixed together at the time of use. Further advantageously the resulting articles are useful as containers for systems where two components are stored separately and later used together such as fuels, glues or construction materials. This is only an exemplary number of possible applications of the resulting articles.

In a particular embodiment of the present disclosure, which can be an alternative or addition to scaling of the skeleton graphs described above, a voxel-based 3D preprocessing is performed, where the inside structure is optimized based on stress and automatically generated. In this embodiment, a pair of skeleton graphs can be generated as previously described with an unscaled density, preferably an unscaled density corresponding to the highest density required for the specific job dependent on stress/strain and article shape. In a further particular embodiment, the voxel-based 3D preprocessing comprises an FEM simulation. In an even further particular embodiment, an article shape is fitted into said skeleton graphs with a homogenous density. Based on either article shape and/or build parameters and/or stress/strain analysis, the skeleton graphs are thinned out by removing individual segments and/or trunks of the graphs thus creating locally denser and less dense regions.

In the context of the present disclosure, a skeleton graph of an unscaled density can be provided by a method of the present disclosure as described above starting from cells in the shape of a rhomboid, bisecting the cells into monotriatruncated tetrahedra and creating skeleton graphs to extend through both groups of monotriatruncated tetrahedra, all as explained above and encompassing the different variations and alternatives as described above. Alternatively, the skeleton graph provided by the method of this embodiment can be provided by a preexisting skeleton graph, for instance from a triply periodic minimal surface known in the art.

One further advantage of the present disclosure can be the provision of an automatable infill system by means of performing a method according to the present disclosure. All this taking into account the FEM simulation, desired resistance, geometry, size, weight, material and device parameters discretionary of the respective print job.

In a particular embodiment of the present disclosure, the skeleton graphs are used to construct surfaces equidistant to both graphs and globally separating the two labyrinths defined by the skeleton graphs.

In a further particular embodiment, a voxel based Voronoi analysis is used to create a first approximation of the surface equidistant to both graphs.

In an even further embodiment, by minimizing the squared mean curvature of this surface, the minimal surface can be created as detailed above. Alternative and/or additionally, the smoothing of the surface can be performed by methods selected from the group consisting of: smoothing by using a Laplace operator, LS3 Loop subdivision, and curvature flow algorithms, etc., or a combination thereof. In an alternative or additional embodiment, by minimizing the squared mean curvature of this surface, an aperiodic minimal surface can be created as detailed above.

In an even further embodiment, the smoothing of the surface equidistant to both graphs obtained by the voxel based Voronoi analysis can be performed by repeatedly applying the following operations: (1) one iteration of LS3 Loop subdivision weighted to enhance regularity, (2) one to ten iterations, preferably three iterations, of smoothing by a Laplace operator using cotangent weighting, and (3) reducing mesh resolution up to 50% using a quadric edge collapse simplification algorithm, or reducing mesh resolution to 50%, or to 25%, or to 12.5%, or to 6.25%, or to 3.125%. Preferably, these operations are performed such that any triangles at border(s) of the surface are left untouched.

By increasing iterations, it is possible to approximate the minimal surface with greater precision. This results in a smoother surface. The number of repetitions can be dependent on computer performance, desired precision, and computing time available, preferably two to three repetitions are performed.

In a particular embodiment of the present disclosure, the skeleton graphs upon minimizing and/or smoothing curvature of the equidistant surface create a triply periodic minimal surface selected from the group consisting of: Brakke's Disphenoid Surfaces of Genus 31, 35, 43, 51, 55 and 67, Brakke's Hexplane Surfaces of Genus 6, 12, 18, 24 and 30, Brakke's Starfish Surfaces of Genus 31, 43, 47, 55, 59, 63, 67, 71, 75, 79, 83, 87, 91, 99, 103, 115, Brakke's Triplane Surfaces of Genus 3, 9, 15, 21, 27, 33, the S, C(S), Y and C(Y) Surfaces by Fisher-Koch, Lord-Mackay's P3a Surface, Neovius' Surface and Schoen's Complementary P Surfaces of Genus 15, 21, 27, 33, 39 and 45, Schoen's Batwing Surfaces of Genus 25, 41 and 57 and Brakke's Pseudo-Batwing Surface, Schoen's F-RD, F-RD(r), P, F-RD, S'-S"|P and S-S" Surfaces, Schoen's GW, I-WP, I-WP(r) and O, C-TO Surfaces, Schoen's Gyroid Surface, Schoen's H'-T, H"-R, T'-R', H'-T|H"-R, T'-R'|H'-T and H"-R|T'-R' Surfaces, Schoen's Hybrid Surfaces S-S", S'-S"|P, H'-T, H"-R, T'-R', H'-T|H"-R, T'-R'|H'-T and H"-R|T'-R', Schoen's Manta Surfaces of Genus 19, 35 and 51, Schoen's RII, RIII, 1-6, 1-8 and 1-9 Surfaces, Schoen/Brakke's N14, N26 and N38 Surfaces, Schwarz' P, D, H, CLP Surfaces, Schoen's Complementary D Surface and all derivatives thereof.

Particularly preferred, the skeleton graphs upon minimizing squared mean curvature of the equidistant surface, or upon smoothing by any other means as described above, create a triply periodic minimal surface selected from the group consisting of: Schwarz P surface type, Schwarz D surface type, Schoen G surface type, Fischer-Koch S surface type, Fischer-Koch CY surface type, Schoen's GW surface type and/or Lord-Mackay's P3a surface type.

The skilled artisan understands from the teaching of the present disclosure that the application of the method herein described might result in a design and/or infill with a quasiperiodic and/or an aperiodic minimal surface not previously characterized as given in any one of the groups above.

In a particular embodiment of the present disclosure, the local adaptation of the skeleton graphs as described above, e.g., by scaling up and/or down and/or removing segments results in a unique minimal surface optimized for a particular article.

One aspect of the present disclosure is the application of the described method in an additive manufacturing design and preprocessing step for the lightweighting and/or designing of an article to be printed. The parameters for a local adaptation and a hyperbolic scaling of the skeleton graphs are then determined based on article geometry, load case finite element simulation, printing method parameters, etc., as required by the skilled artisan for the specific printing job.

One further aspect of the present disclosure is a computer program product for preprocessing an additively manufactured article, wherein the article comprises one or more article parts each with a structure, in particular wherein one of those structures is an internal structure. The computer program product is adapted for executing a method according to the present disclosure when executed on a computer.

One further aspect of the present disclosure is an additively manufactured article obtainable by performing the method of the present disclosure. The article comprises a quasicrystalline and/or a quasiperiodic minimal surface infill and/or quasiperiodic minimal surface design structure and/or an aperiodic minimal surface infill and/or aperiodic minimal surface design structure.

In a particular embodiment of the present disclosure, the additively manufactured article obtainable by the method described above comprises an outer skin defining an article shape and an infill. The infill comprises an essentially quasiperiodic minimal surface. In the context of the present disclosure, an essentially quasiperiodic minimal surface can be an approximation of a minimal surface by performing a smoothing as described in the method embodiments above.

In a further particular embodiment, the additively manufactured article has a minimal surface infill that touches the outer skin in essentially perpendicular direction. In the present context, essentially perpendicular can be understood as tolerating a potential deviation of between 0.1 and 5 degrees from a 90 degrees angle, providing ideal load conduit from the article skin to the infill. In a particular embodiment, the minimal surface is aperiodic.

In a particular embodiment of the present disclosure, the additively manufactured article consists of a metal, even more preferably a metal used for selective laser melting.

With the present disclosure, a universal method for the creation, specification and dimensioning of adapted and optimized structures for additively manufactured articles is presented that enables structuring and infilling these articles with a custom-made structure, tailored to the geometric, structural and printer specific requirements of the specific article as the artisan would define.

In the following, the present disclosure is illustrated by means of figures and particular examples, without being limited thereto. Still, the skilled artisan will be able to derive further advantageous embodiments and implementations of the disclosure by studying the respective examples.

It is perfectly evident for the skilled artisan, that all of the above described embodiments can be incorporated into a method, computer program product and/or article according to the present disclosure in any combination as long as they are not mutually exclusive.

BRIEF DESCRIPTION OF THE DRAWINGS

FIG. 1A to FIG. 1E show schematically how a structure or internal structure according to the present invention can be built;

DETAILED DESCRIPTION

Figure 2A:
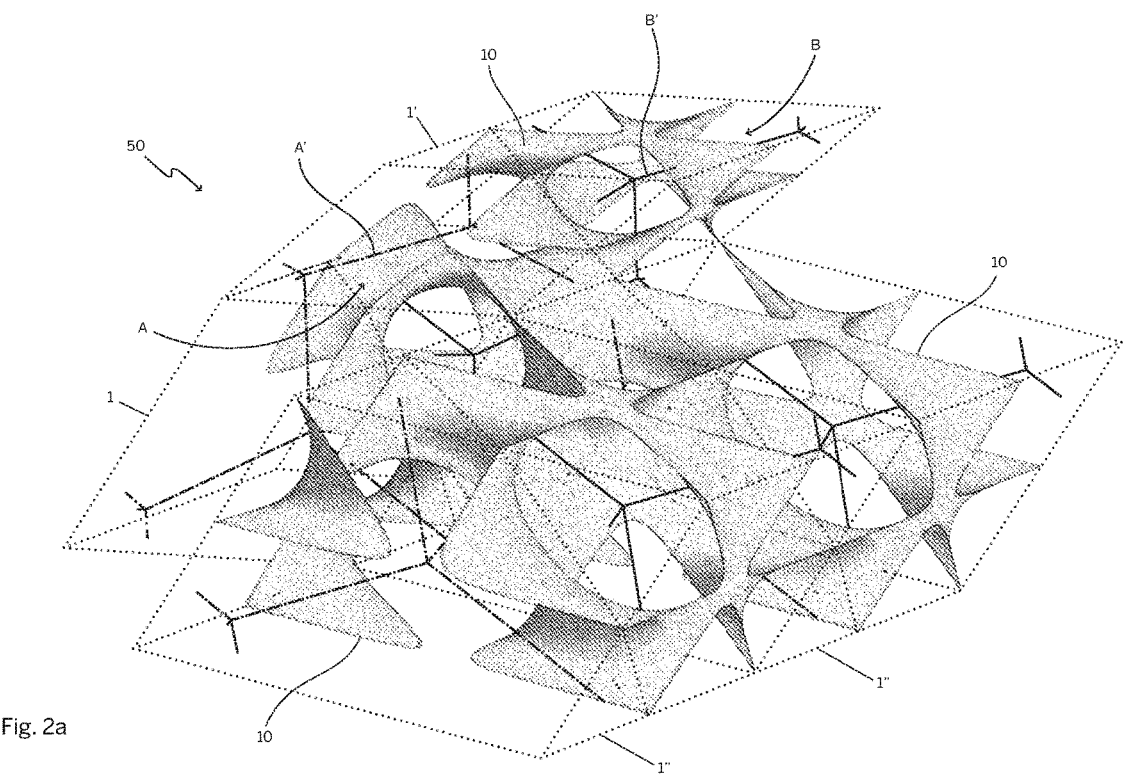
FIG. 2A and FIG. 2B show sample structures obtainable by the method of the present disclosure.

FIG. 1A to 1E serve at illustrating some of the method steps of the present disclosure for the lightweighting and/or designing an additively manufactured article by illustrating a step-by-step approach and schematically leading through the various process steps that can lead to a structure according to the present disclosure in a simplified example.

FIG. 1A shows a cell in the shape of a rhomboid 1 that can be used as the basic starting building block for performing the method of the present disclosure. In a first step, the cell in the shape of a rhomboid 1 with six faces is provided, and in the present example it is composed of six rhomboid faces connected by edges 11 . . . 22 having a total number of twelve edges 11 . . . 22. The cell in the shape of a rhomboid 1 in the present example forms a rhombohedron in which none of the angles between two adjacent edges 11 . . . 22 is right angled. In the context of the present disclosure, the rhomboid shall always be referred to as relating to the three-dimensional form.

The cell in the shape of a rhomboid 1 as depicted in FIG. 1A is a sample representation of such a cell. In this example, the de Bruijn's grid method was used by inputting four vectors as primary input and creating a number of plane families (each of them including or consisting of a number of parallel planes). In the present example the number of plane families corresponds to the number of vectors, e.g., four.

Further in the line of the present example, each plane family has three planes. As already detailed in the general description, the number of planes can be altered depending on a desired resolution for the intended geometry of a resulting quasicrystal structure and is essentially only limited by processing power of a computer system used for designing the article.

In the present example, three planes were used for each plane family and the spacing between the planes was selected to be even, e.g., each plane is arranged equidistant to the respective successive plane with regard to the preceding one. All these planes are normal to the vector. As already detailed above, the arrangement of the planes can be altered to being random or according to certain predetermined distances.

In a first step, the cell in the shape of a rhomboid 1 is bisected. The bisection of the cell in the shape of a rhomboid 1 is performed by placing two tetrahedra 30.1, 30.2 having the same volume inside the cell in the shape of a rhomboid 1, such that only a minimal volume of the respective tetrahedron 30.1, 30.2 remains outside of the cell in the shape of a rhomboid 1, and none of the volume of the cell in the shape of the rhomboid 1 is not covered by the respective tetrahedron 30.1, 30.2. In the depiction of FIG. 1A the tetrahedra 30.1, 30.2 are shown with a dotted line. The tetrahedra 30.1, 30.2 are placed into the cell in the shape of the rhomboid 1, such that a pyramidal tetrahedron each is cut from the edges of the tetrahedra 30.1, 30.2. The contact face between the two tetrahedra 30.1, 30.2 will form an intersection face F (see FIG. 1B). In the present example, the contact surface between the two tetrahedra 30.1, 30.2 cuts the lateral edges 13, 14, 15, 17, 19, 20 in the middle of the respective edge length. The angles of the tetrahedra 30.1, 30.2 are chosen to match the angles of the cell in the shape of a rhomboid 1.

Further, a first tetrahedron 30.1 of the two is allocated to a first group A, whereas a second tetrahedron 30.2 is allocated to a second group B.

As shown in FIG. 1B, the bisection of the cell in the shape of a rhomboid 1 results in an intersection face F that is hexagonal with each corner being on a respective lateral edge of the cell in the shape of a rhomboid 1, and, in the present example, exactly in the middle of said edge. The cell in the shape of the rhomboid 1 is bisected in two bodies of equal volume. For the sake of the present disclosure these two bodies have been named monotriatruncated tetrahedra 2, 2'. As already outlined above, for the context of the present disclosure a truncated tetrahedron can be understood as a regular tetrahedron with the four corners cut away. The monotriatruncated tetrahedron on the other hand is a tetrahedron of which only three of the four corners are cut away. Compared to the truncated tetrahedron it has seven faces instead of eight.

The bisection thus results in two monotriatruncated tetrahedra 2, 2', corresponding to the tetrahedron used for the bisection, and fitting into the respective half of the cell in the shape of a rhomboid 1. Each of these monotriatruncated tetrahedra 2, 2' belongs to either one of the groups A or B. In the illustration of FIG. 1B the monotriatruncated tetrahedron 2 on the left belongs to the group A, whereas the monotriatruncated tetrahedron 2' on the right belongs to the group B. It is perfectly evident for the skilled artisan that this division is purely arbitrary, and for the purpose of illustrating the teaching of the present disclosure it is relevant that on the basis of any one cell in the shape of a rhomboid, by bisecting the cell into two equal volume tetrahedra, each essentially inside a structure with a multitude of cells in the shape of a rhomboid, two groups are created A, B, each of which forming a labyrinth as shall later be outlined further down.

For the present example, after an initial allocation of a monotriatruncated tetrahedron 2, 2' to either one of the groups A or B, the same logic is essentially to be followed for all cells in the shape of a rhomboid inside one structure. With other words, if the half on the "left" is elected to belong to group A, then across the complete structure, all halves that are logically the "left" halves would form a monotriatruncated tetrahedron 2 belonging to the A group.

This allocation of the monotriatruncated tetrahedra 2, 2' to one group already creates two interwoven continuous and quasiperiodic infinite polyhedra inside the structure.

FIG. 1C illustrates a further method step. In each of the resulting monotriatruncated tetrahedra 2, 2' a skeleton graph A', B' is inserted. The skeleton graphs A', B' depicted in FIG. 1C are illustrative examples of how such skeleton graphs can be inserted into the respective monotriatruncated tetrahedron 2, 2'. By doing so for each cell in the shape of a rhomboid of the respective structure, the skeleton graphs A', B' extend such as to span the entire volume of the structure. Each skeleton graph A', B' is connected with skeleton graph(s) A', B' in a neighboring monotriatruncated tetrahedron of the same group. For illustrating the group affiliation in the present example, the skeleton graphs are referenced with the same letter as the group they belong to, e.g., skeleton graph A' of FIG. 1C extends into the volume created by all monotriatruncated tetrahedra 2 belonging to group A.

In the present example as depicted in FIG. 1D, the skeleton graph A' branches from two internal nodes N1, N2. The internal nodes N1, N2 can be arranged inside a specific region N inside the volume of the monotriatruncated tetrahedron 2 belonging to group A. This can result in a "trunk" of a tree-like structure for the skeleton graph inside the monotriatruncated tetrahedron 2. The "trunk" is of varying size, up to a particular embodiment, where the first internal node N1 and the second internal node N2 are the same, e.g., are on the same spot and the "trunk" length is zero.

In the present example, the first internal node N1 and the second internal node N2 are spaced apart and branch into three limbs each. For the sake of clarity of the figures, the branching is illustrated by means of referenced example in the monotriatruncated tetrahedron 2' belonging to the group B. Here, the first and the second internal nodes are spaced apart and connected by a trunk b1. Each internal node branches into three limbs and these limbs cut the surfaces of the monotriatruncated tetrahedron 2' in particular areas. For the construction of the skeleton graph B' belonging to the group B, each monotriatruncated tetrahedron 2' connects to adjacent monotriatruncated tetrahedra and has a connection node bi . . . bl, that touches the connection node of the respective neighboring monotriatruncated tetrahedron in a particular node face G . . . L. For instance, a branch of the first node of the skeleton graph B' in FIG. 1D extends through the node face G and cuts that face at the connection node bg. This connection node bg is the point where the respective limb of a neighboring skeleton graph connects with the skeleton graph of the monotriatruncated tetrahedron 2' of FIG. 1D.

The resulting's skeleton graphs A', B' span and encompass the entire quasicrystal without interconnecting at any point. FIG. 1E depicts the step of creating a minimal surface infill structure by means of constructing a surface equidistant to both skeleton graphs. This separates the volume of the complete structure that is filled with the infill or designed to be built from structure according to the present disclosure into two separate volumes A, B. The structure can be dynamically adapted to adjust to varying geometries of the article and as the cell in the shape of a rhomboid 1 of the present disclosure is chosen in FIG. 1A to 1E to be simple on purpose, it is evident to the skilled artisan that inside a structure, a number of compressed, expanded or distorted cells in the shape of a rhomboid can exist. The constructing of a surface equidistant to both skeleton graphs can comprise an approximation of a surface equidistant to both skeleton graphs.

In the present example, the structure 10 is depicted with the two respective skeleton graphs A', B' and the respective internal volume A, B through which the skeleton graphs A', B' expand belonging to one specific group A or B.

In this particular example, a minimizing a squared mean curvature of the surfaces equidistant to both graphs by FEM-based computer processes has been applied. Depending on the spatial, geometric and mechanic constraints and load cases given for the article, with the present method the structure is unique and specifically adapted for the article. With this most basic principle of the present disclosure, a method is provided with which a countless number of articles can be built including or consisting of the structure as described above or comprising the structure as described above as an infill and internal structure for load bearing or other structural reasons. Further, as the method of the present disclosure essentially perfectly separates a given volume into two equal labyrinths, applications where such a division of a volume in two compartments is desirable profit greatly from the teaching of the present disclosure.

Figure 2B:
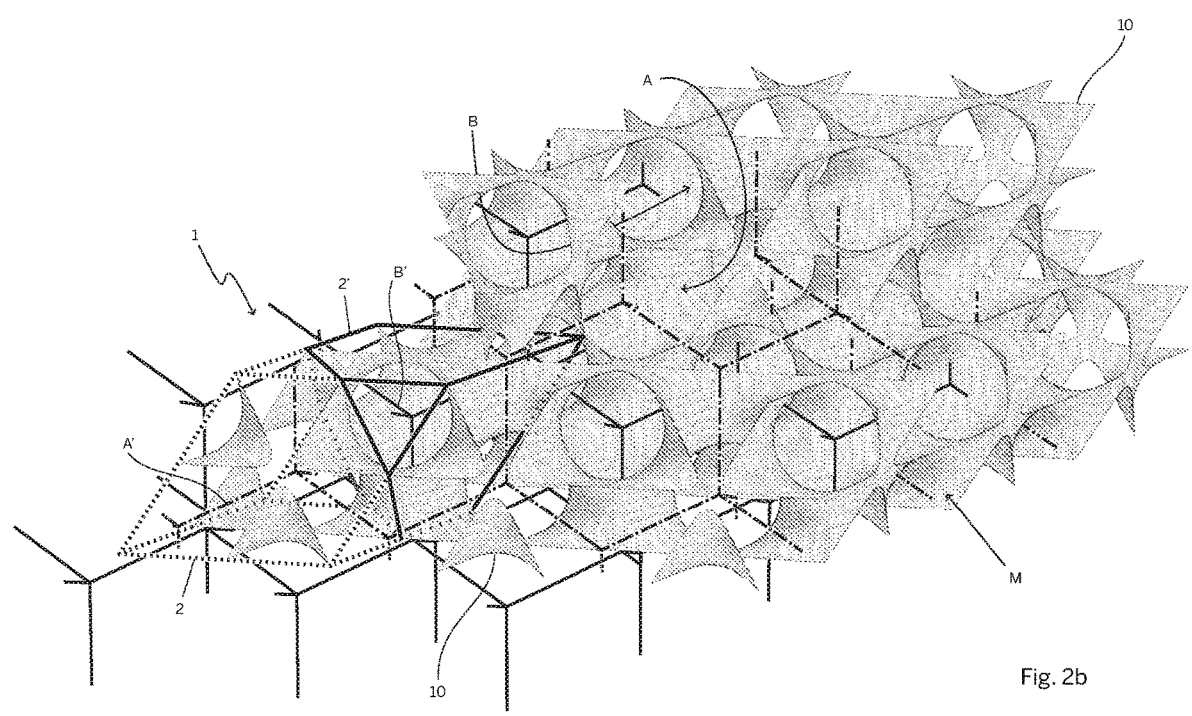

FIG. 2A illustrates how an article 50 can be built by having a plurality of cells in the shape of a rhomboid 1, 1', 1". In the present example of FIG. 2A for illustrative purposes a total of four cells in the shape of a rhomboid 1, 1', 1" is shown, where two of these cells in the shape of a rhomboid 1", 1" are identical to each other, and two further cells 1, 1' are different from each other and from the previously stated type of cell in the shape of a rhomboid 1", 1". As can be seen from FIG. 2A the skeleton graph A' which extends through the volume A that is separate from the volume B by the structure 10, spans through each of the cells in the shape of a rhomboid 1, 1', 1". The structure can be expanded with further cells based on the specific needs of the article to be manufactured and in FIG. 2B it is illustrated, that, regardless of how large the article is formed, and how many cells are added, the basic building blocks follow the same principle as the cell in the shape of a rhomboid 1, and the respective monotriatruncated tetrahedra 2, 2' still form the basic building blocks and enable the placement of the respective skeleton graphs A', B', which extend through the internal volumes A, B and span the whole volume of the article.

Figure 3A:
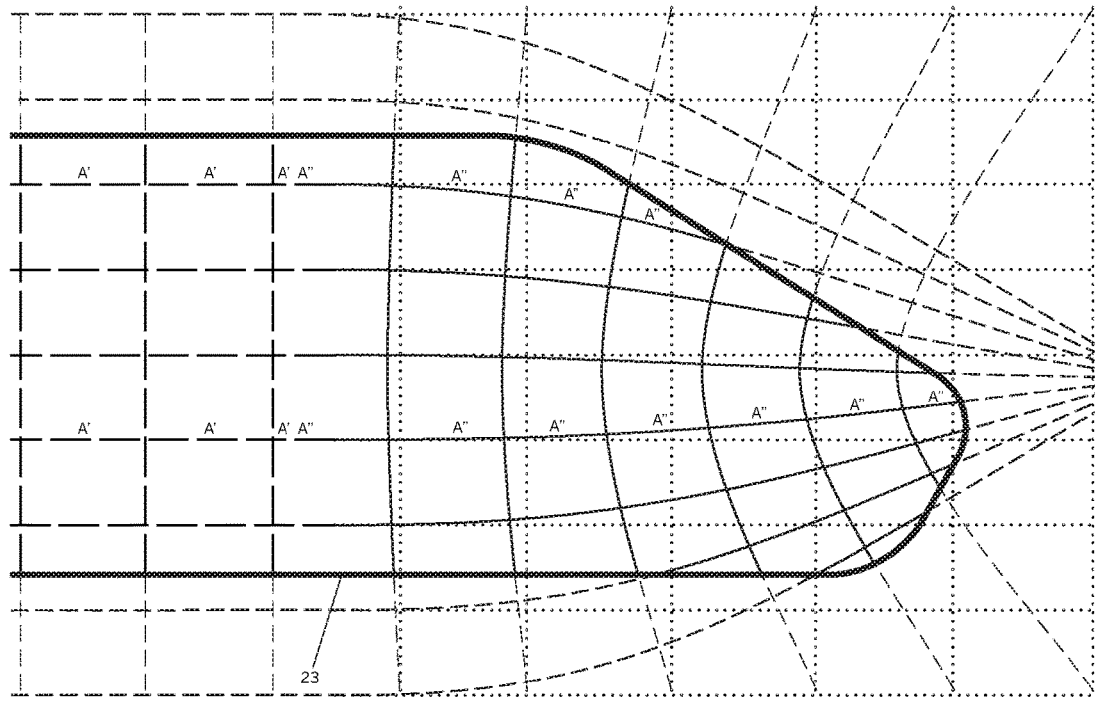
FIG. 3A and FIG. 3B show schematically how a scaling down according to the present disclosure can be performed on illustrative geometries.
Figure 3B:
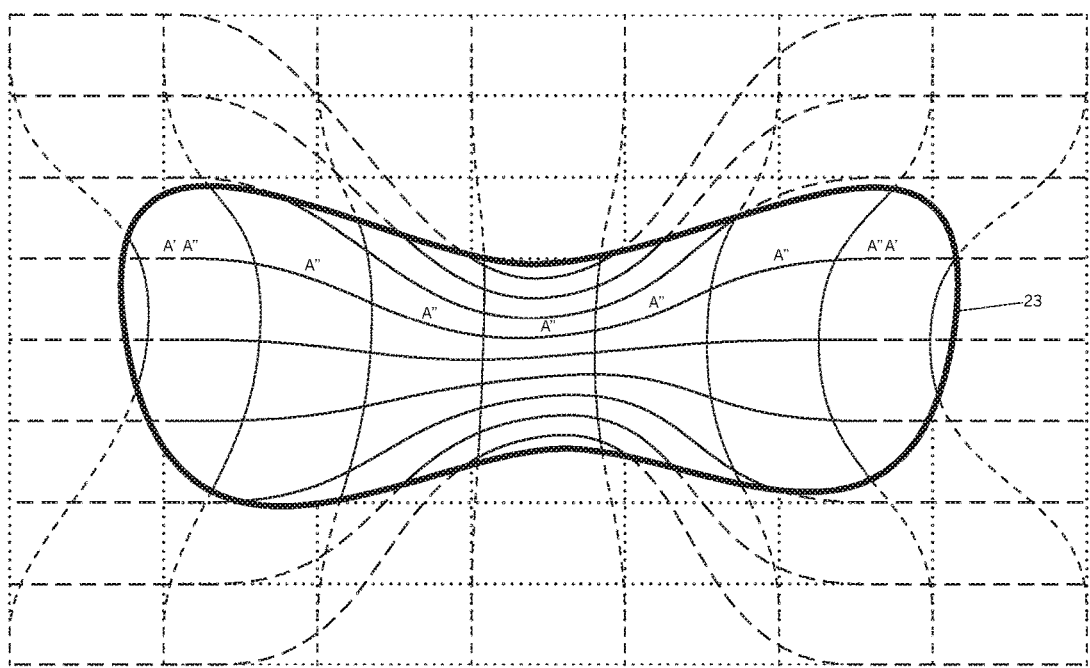

One advantageous concept of the present disclosure is illustrated in FIGS. 3A and 3B. The method of the present disclosure can easily be adapted to accommodate varying geometries of articles and can lead to optimizing structural integrity and load case for a great number of articles by scaling the structure according to the geometry of the article.

FIG. 3A shows an example where an infill for a front end of an article comprising an outer skin 23, where the skin 23 that defines the article shape, is adapted by applying a hyperbolic scaling to the skeleton graph A'. The same scaling is of course applied to skeleton graph B' (not shown in FIG. 3A, though for ease of clarity).

Beginning with the tapering of the front end of the article, the internal structure is scaled by densifying the skeleton graph A' to a denser skeleton graph A". This prevents the tapered geometry of the frontend of the article having an internal structure that has weak points underneath the surface of the skin 23 at any point. By scaling the skeleton graph A' down, the resulting minimal surface structure providing the internal structure for the article adapts to the geometry, such that an optimal stability and infill is provided in all geometries. This enables the additive manufacturing of articles with an optimized internal structure and infill by using a smaller scale infill where the geometry requires it, or a larger scale infill (not shown in FIG. 3A) where that is preferred. The scaling can further be influenced by not only the three-dimensional geometry of the article, but also made dependent on printer parameters or load cases for the respective article.

An alternative example is depicted in FIG. 3B, where a local densification has been applied for the central piece of an essentially bar-bell-shaped article. The skeleton graphs A' are hyperbolically scaled to densified skeleton graphs A". This densified structure would by superimposing the article shape over a skeleton graph have been outside of the article. By means of scaling, a more densified region is created under which the skin 23 is supported by an internal structure that is denser, e.g., provides a higher stability to the article.

FIG. 4A to 4D depict an aspect of the present disclosure, where a basic set of two intertwined skeleton graphs A', B' created with a method according to the present disclosure is adapted as an infill for an article having an article shape 25. The article shape 25 is essentially an L-shaped article; in a first step of this use of said couple of skeleton graphs A', B', the article shape 25 is superimposed into a grid formed by the two skeleton graphs A', B'.

Figure 4A:
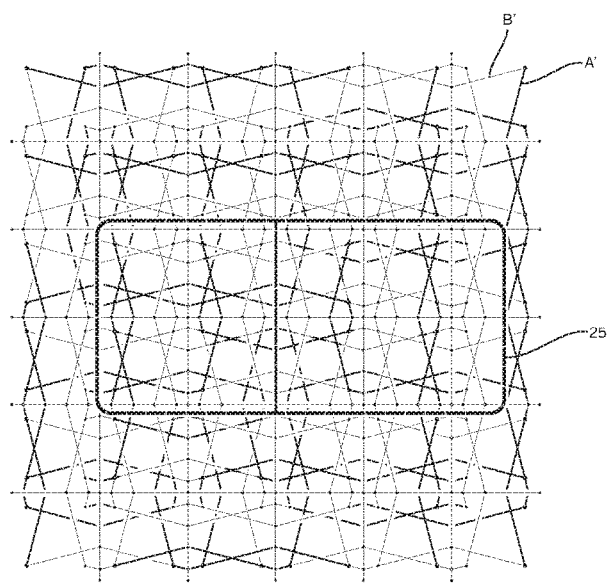
FIG. 4A and FIG. 4D show schematically how a sample object can be filled with an adaptively scaled structure according to the present disclosure.

FIG. 4A shows how such an article shape 25 is placed from a top view.

Figure 4B:
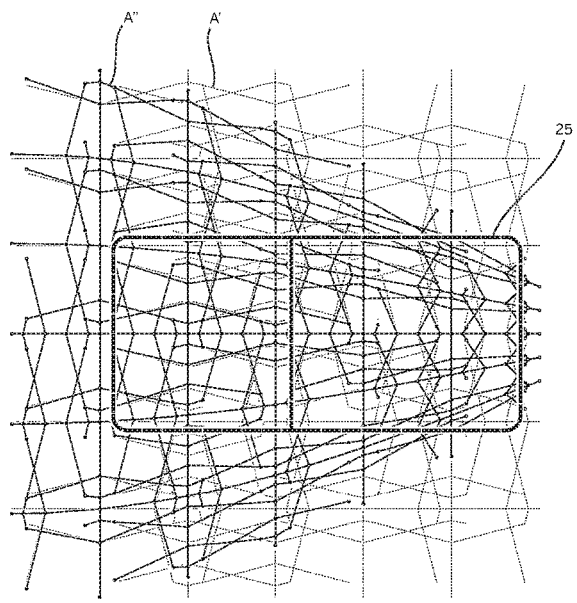

In FIG. 4B, the article shape 25 is still shown in top view but by comparison the skeleton graph A' is densified into a densified skeleton graph A" by means of hyperbolic scaling. For ease of representation the skeleton graph B' and its respective scaling into a densified skeleton graph B" is omitted. It is visible that from left to the right, the protrusion of the article shape 25 is filled with "comparatively more" skeleton graph than in the left. This results in a denser region providing better structural integrity and potentially skin support. Note though, that the skeleton graph serves as a template or blueprint for a quasiperiodic minimal surface that separates the internal volume of the article shape 25 into two labyrinths A, B which would fit the skeleton graphs A', A" respectively. The scaling of the skeleton graphs thus results in a scaling of the quasiperiodic minimal surface additively manufactured in a resulting article as an infill for the present sample article.

Figure 4C:
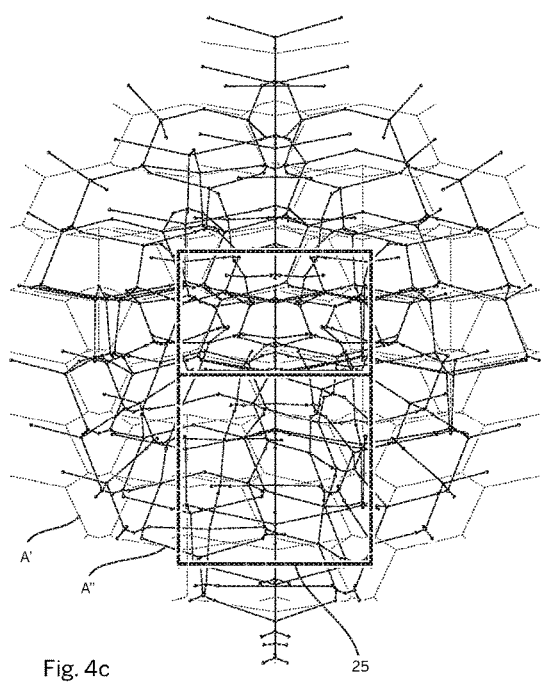

FIG. 4C shows the same article with a densified A-group skeleton graph in front view, e.g., with the protrusion extending into the direction of the viewer.

Figure 4D:
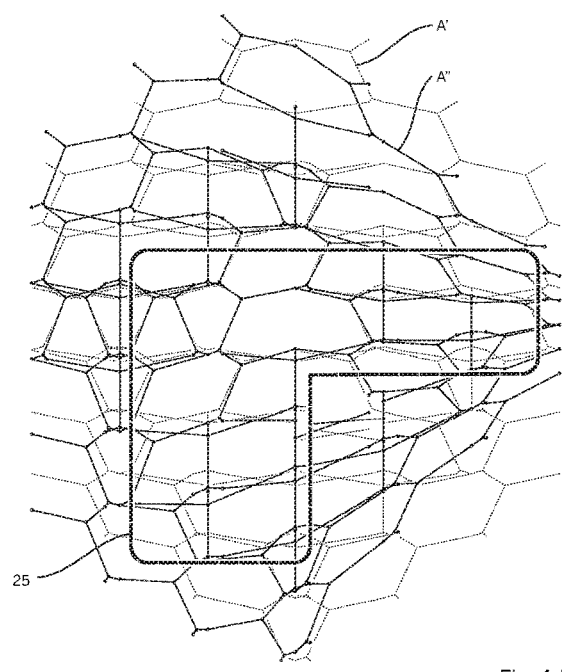

In an analogous fashion, FIG. 4D depicts the article shape 25 in a side-view where analogous to the FIG. 4B the densification of the skeleton graph A' into a densified skeleton graph A" increases from left to right.

In all the above figures the non-scaled original skeleton graph A' is displayed for reference purposes and for illustrating the concept as a dotted skeleton graph.

FIGS. 5A to 5E illustrate an alternative way of adapting the infill to a particular geometry of an article and the load bearing needs that can also be used additionally to the method above, though. The illustration is meant to guide through the method and is not intended to be a real-life working example. For this reason, some simplifications have been made on the figures. One such simplification is the depiction of only one skeleton graph A'. In a real implementation, of course the following description of the thinning of skeleton graphs would apply to both graphs of a pair (as created by a method illustrated in FIG. 1A-1E, above).

Figure 5A:
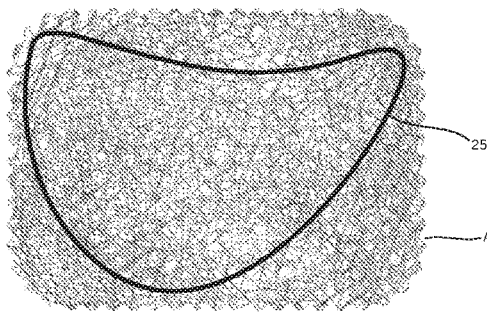
FIG. 5A to FIG. 5E show schematically how a sample object can be filled with an adaptively scaled structure according to a further embodiment present disclosure.

FIG. 5A depicts how an article with an article shape 25 is superimposed over an unscaled skeleton graph A' of essentially homogenous density. The density was chosen as high as needed for the present example and may be driven by the expected needs of the article shape with respect to load bearing and geometry, e.g., as high as the highest required final density in the article.

Figure 5B:
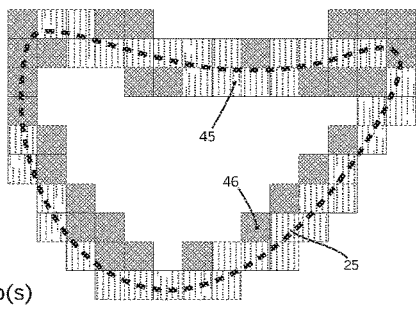
Figure 5B:
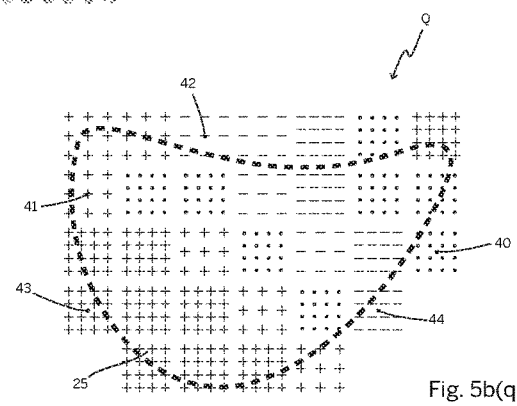

In FIG. 5B(S) the article structure 25 undergoes a first analysis, where article shape 25 and geometry dictate which regions are required to be more densely infilled and which can be infilled less densely. For this, the article is divided into cubes of a size such that each cube contains at least several trunks of the skeleton graphs, preferably contains more than three trunks, even more preferably 5 to 8 trunks, even further preferably less than 100 trunks. Presently, distinction is made between two types of cubes: cube(s) supporting build process 45 and cube(s) at article boundary 46. Depending on the determination of type of cube, an operation to remove units of skeleton graphs can be performed in a particular cube. In the context of the present disclosure, a unit of a skeleton graph is to be understood as the branch inside one particular monotriatruncated tetrahedron. Of course, as they always come in pairs, that means removing two branches of skeleton graphs, e.g., a pair inside two monotriatruncated tetrahedra originally belonging to the same cell in the shape of a rhomboid.

FIG. 5B(Q) depicts a second analysis performed on the article structure 25, where voxel-based load case analysis is performed again with the help of cubes, with each cube spanning a multitude of voxels, preferably each cube spanning the same number of voxels. This can be performed by sorting cubes based on their stress/strain requirements and characteristics. In the present example five types are distinguished: zero stress cube(s) 40, cube(s) with little positive stress (compression) 41, cube(s) with little negative stress (tension) 42, cube(s) with high positive stress (compression) 43 and cube(s) with high negative stress (tension). Depending on the characteristics a specific operation can be predetermined: for instance, essentially all or most units can be removed within zero stress cube(s) 40, half the units within cube(s) with little positive stress (compression) 41, etc., depending on the parameters of the load case analysis. In a real case, of course, many more incremental steps and respective adaptations are made, and the cube(s) are considerably smaller.

Figure 5C:
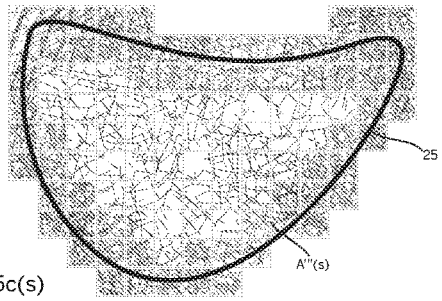
Figure 5C:
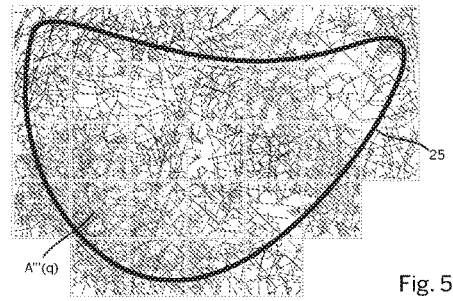
Figure 5D:
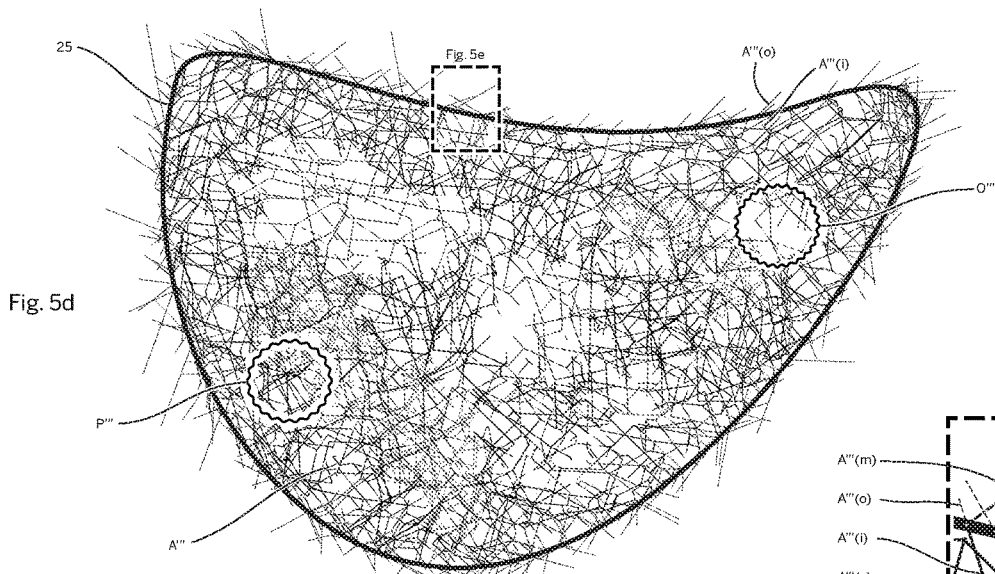

The resulting adapted skeleton graphs A''' (B''' omitted for clarity in the figures) are generated individually for the article shape 25 analysis resulting in a shape-following partially thinned-out A-group skeleton graph A'''(s), as shown in FIG. 5C(S) and a load-following partially thinned-out A-group skeleton graph A'''(q) as depicted in FIG. 5C(Q).

The resulting combined scaled skeleton graph A''' achieved by unification of A'''(s) and A'''(q) is shown in for the complete article structure 25 and has low density regions (thinned-out high resolution skeleton graphs) O''' and high-density regions (high resolution skeleton graphs) P'''.

Figure 5E:
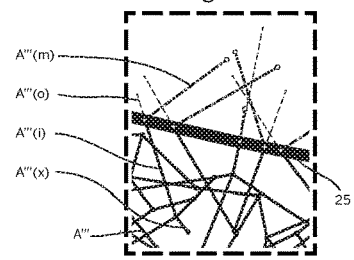

FIG. 5E shows a final tuning step, open end segments A'''(x), e.g., segments that do not connect to any further segments and end into void, have been removed. Further, from the outermost segment(s), e.g., segments that would traverse the skin of the article, the parts A'''(o) outside of the skin are removed and replaced with a mirror image A'''(m) of the segment part inside A'''(i) the article. Whereby the mirror image is a mirror image of the part inside which is mirrored about the skin, at the place where it is traversed by the segment. After this tuning step, the Voronoi analysis as described earlier is performed and the zero-mean curvature surface is calculated between the skeleton graphs. This ascertains that the resulting minimal surface M (analogous to the structure 10 of the previous examples) touches article surface 50 in essentially perpendicular direction, thus providing ideal load conduit from the surface to infill. In the present context, essentially perpendicular can be understood as comprising a deviation of between 1 and 5 degrees from a 90 degrees angle.

Figure 6A:
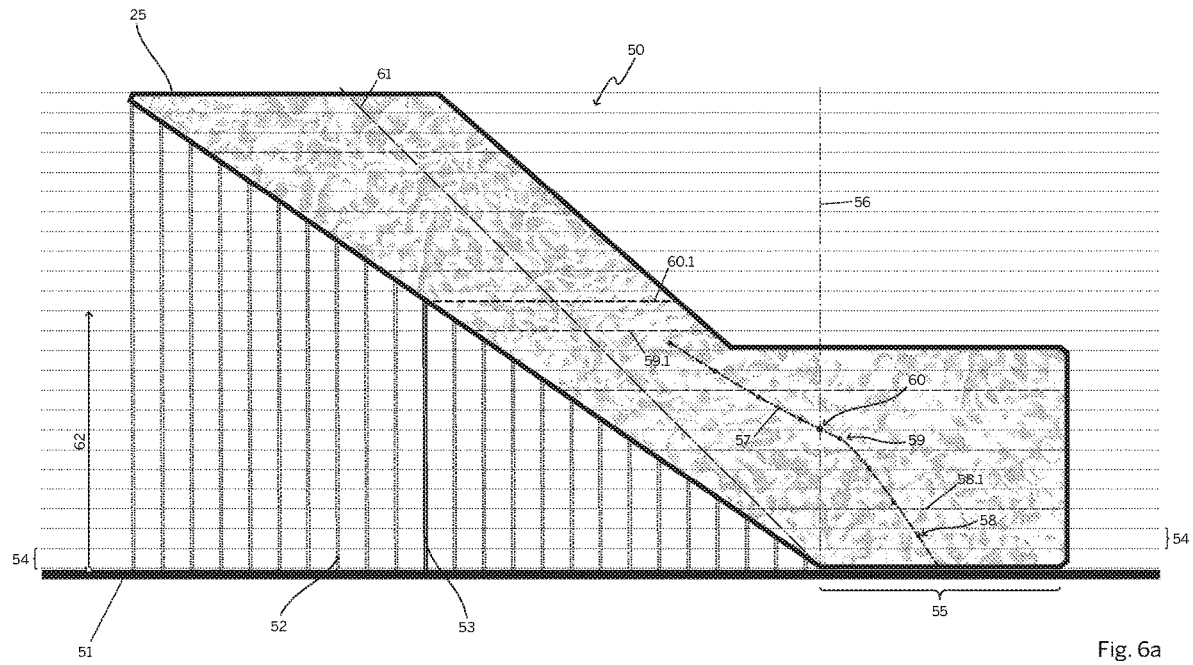
FIGS. 6A and 6B show an example of the present disclosure.

FIG. 6A shows how a particular example of the present disclosure that can be executed for a manufacturing process with additive manufacturing of an article which would normally require a plurality of build supports. The article 50 comprises an infill of structure 10 based on a minimal surface obtainable by the method of the disclosure. The structure is adapted to a shape 25 of the article and constructed in a progress 62 from a build platform by addition of print layers 54.

By means of the present disclosure, a manufacturing with a minimum number of build supports is made possible. This is illustrated exemplarily in FIG. 6B.

Presently used methods for additive manufacturing comprise the building of an article from successive layers initially placed on a build platform 51. Methods using metal as additive material of the state of the art must cope with a maximum angle from layer to layer of 45°, after which a build support is required for holding the layer in place during the process of building to dissipate heat and to prevent deformation of the article in production. For the purpose of the present example, a selective laser melting rapid prototyping method is performed for additively manufacturing an article with an article shape 25 that has an inclination on one part that is less than 45° relative to the build support 53. The fabrication method of selective laser melting is performed in a powder bed into which the desired shape is selectively melted by use of a laser, e.g., an ytterbium fiber laser, in one plane at a time where successive layers of powder are applied onto the shape synchronously with the laser operation.

Figure 6B:
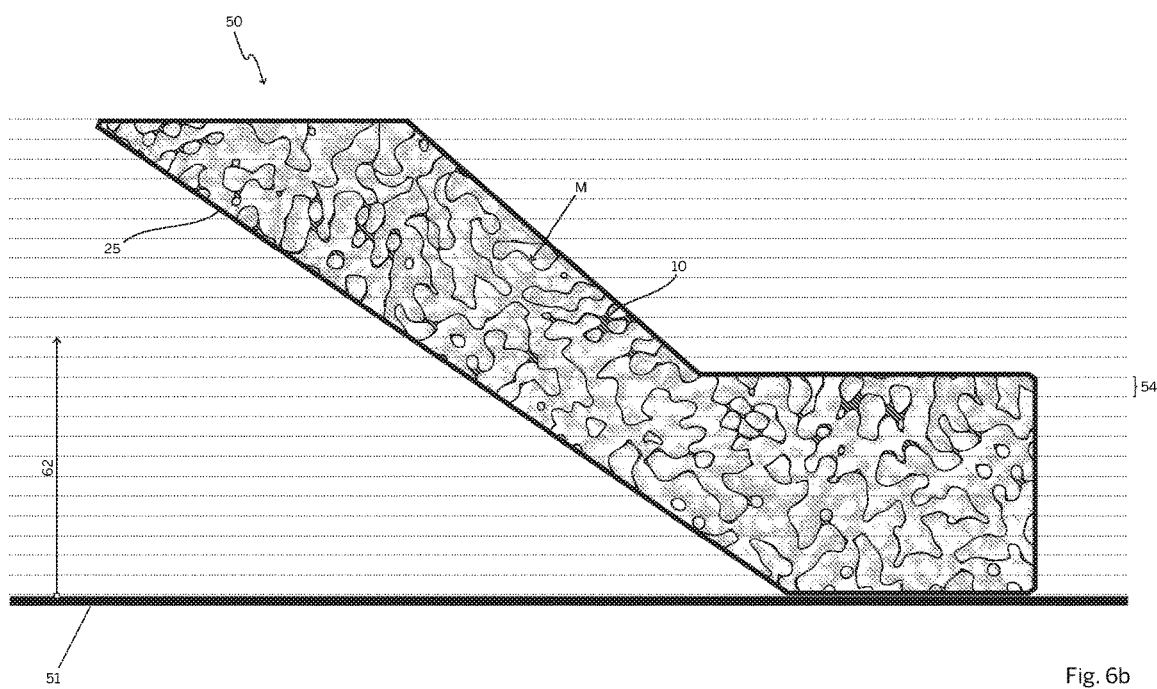

In the present example of FIG. 6B, for illustrative purposes, the required support structures according to the state of the art 52 are shown for comparison with only one required build support 53 that is sufficient to execute the additive manufacturing of the article 50 with a particular article shape 25. For the sake of this example, the article shape 25 corresponds to an outer skin of the article. Starting from the build support 53, a number of print layers 54 is added in progress 62 direction. The printing begins with a first layer of a contact area 55 of the article 50, which is a resting area that contacts the build support 53. The depositing of the layers 54 is executed in a building progress 62 direction. As the building progresses with structure 10, the center of gravity 58, 59, 57 of the article shifts from the middle of the contact area 55 to the left, e.g., in the direction of the overhanging part on the left. A center of gravity track 57 is shown in FIG. 6B to depict the shift of the center of gravity 58, 59, 57, 60 as layers are added. For instance, a center of gravity 58 is offset from the center of the contact area 55 after a couple of layers of the overhanging part on the left have been formed. The center of gravity 58, 59, 57, 60 moves further to the left, up to the center of gravity at a certain time point 59, being clearly offset and at a time point X, the center of gravity 60 having reached the vertical delimit 56 of the contact area. Progressing beyond this delimit 56 shifts the center of gravity beyond the contact area 55, after which the article 50 risks tipping and spoiling the form when no supports are used at this given angle. The maximum angle of state of the art printing without requiring support structures displayed in maximum state of the art angle for unsupported build 61. This is essentially a 45° angle.

At the time point X the article upper boundary 60.1 is printed and the center of gravity is about to pass vertical delimiter 56.

For printing the article as depicted, instead of having a plurality of build supports 52, only one build support 53 approximately at the upper boundary at time point X where the center of gravity of the article moves beyond or is just at the contact area vertical delimiter is sufficient to support the article and provide sufficient stability for a continuing of the overhanging part on the left. The maximum state of the art angle for unsupported build 61 is shown for reference. With the teaching of the present disclosure, printing with steeper angles with less support than previously required becomes possible by the infill structure 10 providing enough support.

Besides enabling building articles with steeper angles, the present disclosure and the method disclosed herein also provide advantages in a selective laser melting by providing an optimal heat dissipation inside the build structures. As the minimal surfaces of the present disclosure always dissipate heat in an optimal path, the article dissipates onto the build platform more efficiently, which can enable increased print speed and/or increased stability and/or smoothness of surfaces melted.

Figure 7A:
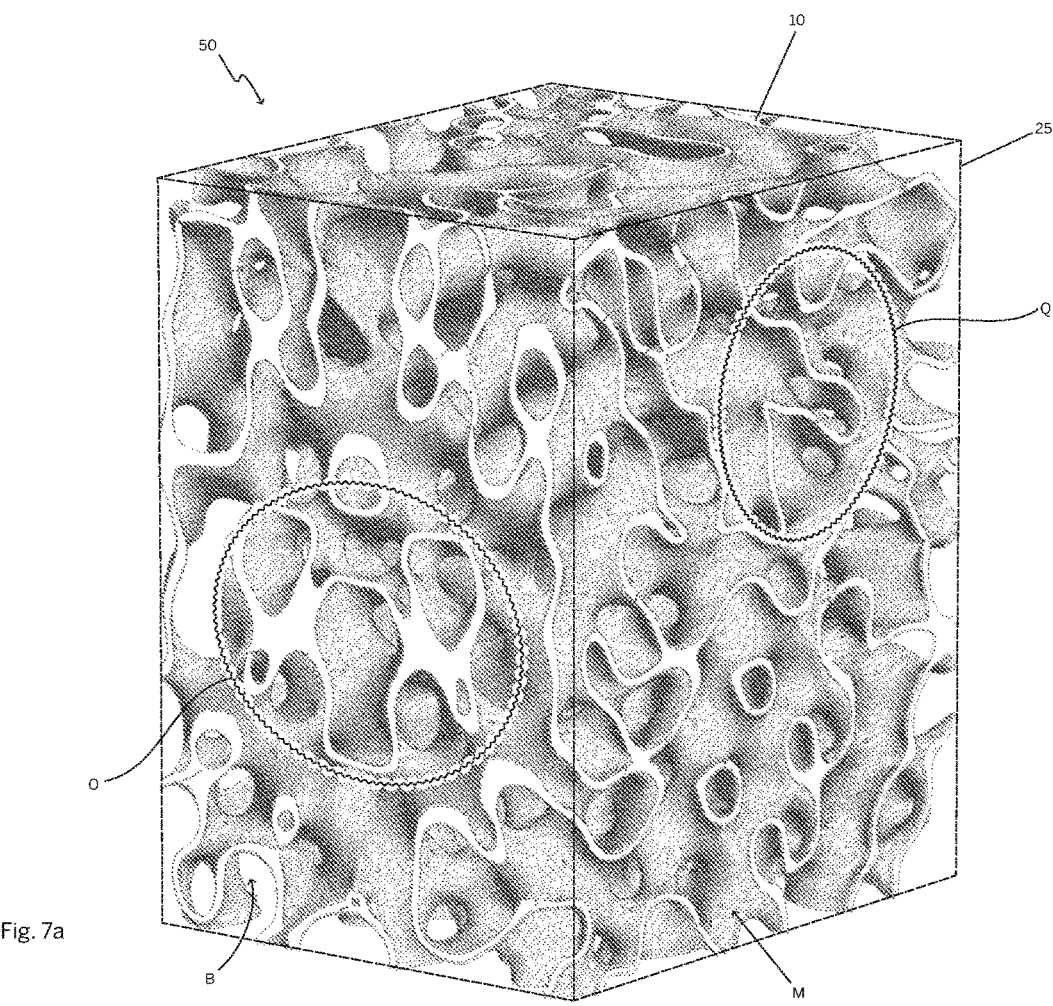
FIGS. 7A and 7B show sample internal structures and/or structures according to the present disclosure.

For the present example, an EOS GmbH type M290 printer was used equipped with an ytterbium fiber laser with 400 W. As an alloy, NEOS maraging steel MS1/1, 2709 available from EOS has been used with a grain size of 20 to 65 μm. Resulting articles can take the shape as shown in FIGS. 7A and B. In FIG. 7A an outer skin (corresponding to an article shape 25) has been omitted to show the infill and internal structure of the article 50. The internal volume of the article is subdivided into two labyrinths A, B. The structure 10 is a minimal surface structure and comprises upscaled area O and downscaled area P, where the hyperbolic scaling as described above has been performed to achieve certain structural characteristics at the given areas.

Figure 7B:
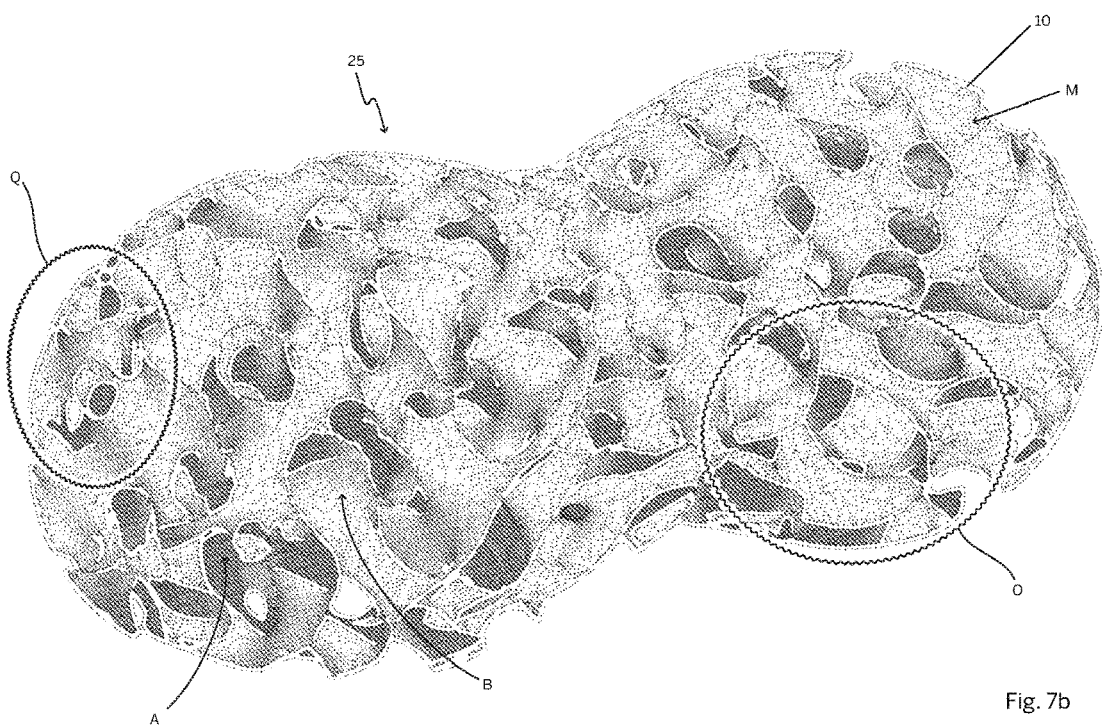

In contrast to FIG. 7A the article 50 of FIG. 7B has no outer skin, and the article surface corresponds to the structure 10 itself. The essentially bar-bell-shaped article 50 also separates its volume into two labyrinths A, B. Also illustrated is an upscaled area O, where the structure 10 is less dense, and a downscaled area P, where the structure 10 is densified such as to result in a more stable surface.

Figure 8:
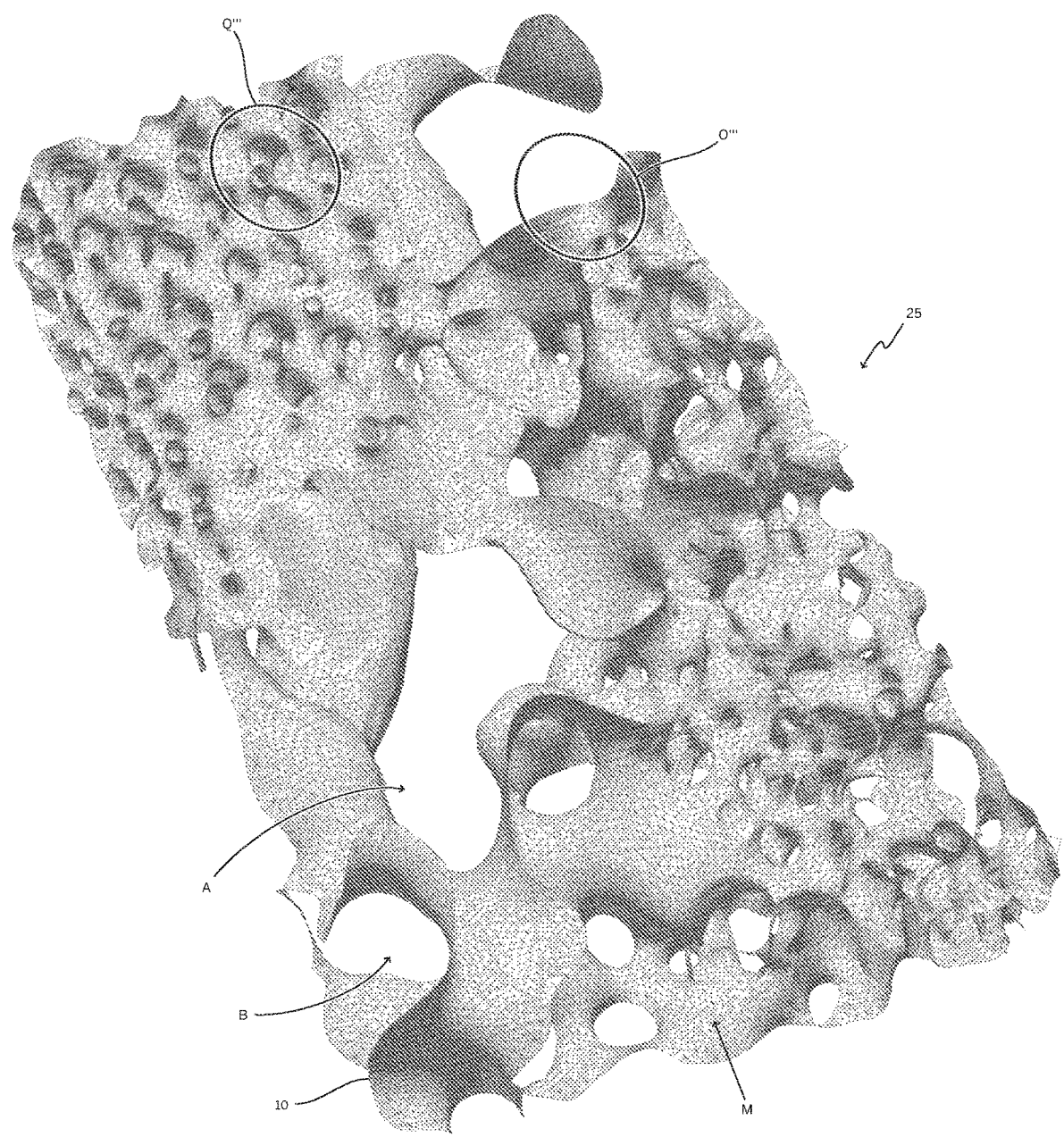
FIG. 8 shows an embodiment of the present disclosure based on the method according to FIG. 5A to 5E.

FIG. 8 shows an article obtainable by a method described in FIG. 5A to 5E where thinning of the skeleton graphs segments is performed based on article shape and/or build parameters and/or stress/strain analysis by removing individual segments and/or trunks of the graphs to create locally denser and less dense regions is depicted in FIG. 8. An article shape 25 is shown without an outer skin, which has been removed to better provide an inside view. If the article shape 25 would be present, the article shape 25 would be essentially cubic.

The article has several regions, which depending on the shape and/or load case analysis have been found to be printable with low density infill or which have been found to require high density infill. Inside the article an aperiodic minimal surface subdivides the volume into two labyrinths A and B, separated by the structure 10 forming the infill. The structure 10 is a minimal surface M. A low-density area O''' that has been thinned-out from high resolution skeleton graphs is visible in the upper right of the article. And a high-density area P''', where the original density of high resolution skeleton graphs has been maintained is visible on the left of O''', about the left upper corner of the article.

Figure 9:
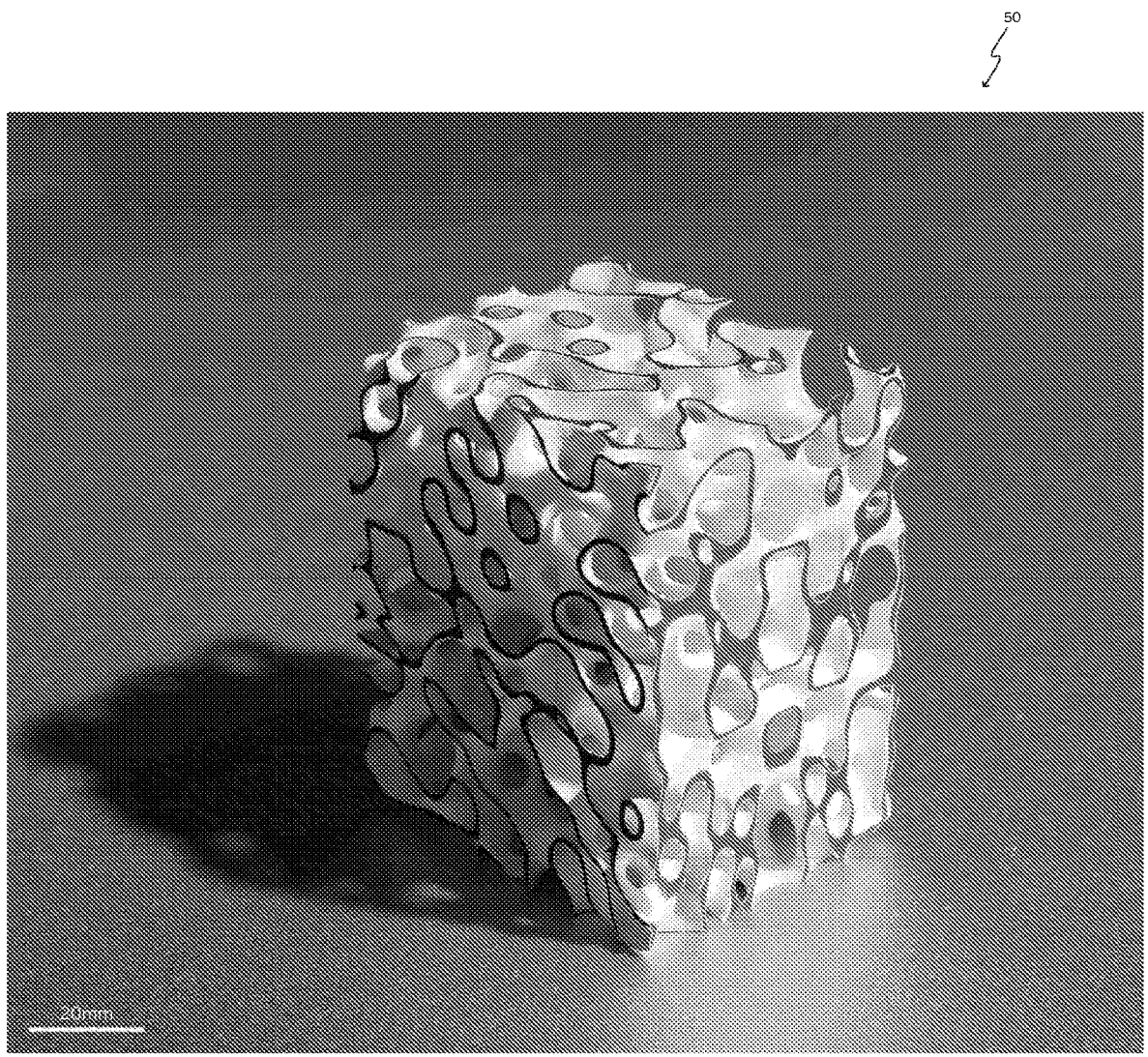
FIG. 9 is an image of an article without outer skin built according to the teaching of the present disclosure.

FIG. 9 is a photograph showing an article 50 printed according to a method of the present disclosure.

Articles obtained by the method of the present disclosure can be used in a great number of applications. One of the most basic applications, is to use an article as shown in FIG. 9 as a building block for lightweight building, where stability and weight are important factors. The method of the present disclosure shows that the printing of metal structures is possible and provides articles with enormous stability, that are light and have an optimal heat dissipation, while separating a volume into two distinct and separate labyrinths.

In a further example of the present disclosure, the method and teaching of the present disclosure is used as a preprocessing for an article intended for an additive manufacturing by using computer software integrating an executable adapted at performing the present disclosure. Additive manufacturing design and preprocessing workflows comprise a first step of generating a three-dimensional model. Most commonly this is done by CAD-designing, adapting or enquiring a respective model.

In a second step, forces are simulated. This can be done by a finite element simulation (FEM) and can further comprise a dimensioning and optimization step for adapting the design, or changing the topology as required by the force simulation. The preparing for print comprises the lightweighting and applying a simple infill which increases polygon count in the simulation. A print simulation is then performed to check whether the print recipe can be genuinely printed. External and internal supports as required are also integrated in this method step. For executing the printing, a slicing is performed that is dependent on the build process parameters and printer settings that are mostly hardware driven. The build step then is a layer by layer roughly corresponding to a slice-by-slice dependent on the previous step of slicing additive manufacturing of the article.

The present disclosure comprises an alternative or additional tool for performing the lightweighting and for providing the infill as outlined in the process steps of the preprocessing above.

Alternatively, or additionally, the method of the present disclosure can also be used to create a structure from raw. This means that the method of the present disclosure can be used to create a structure where the infill generated by the method as detailed above is the structure by itself.

Therefore, a further aspect of the present disclosure relates to an article obtainable by the method described above having the characteristics as described earlier. An even further aspect also relates to a computer program product that comprises the operational instructions and/or the skeleton graphs required to apply a preprocessing on an article based on the teaching of the present disclosure.

Although the examples herein have been described with selective laser melting, the skilled artisan can easily recognize that the method of the present disclosure is equally applicable with any other type of additive manufacturing techniques such as vat polymerization, material jetting, binder jetting, material extrusion, directed energy deposition or sheet lamination as required by the respective printer and for the purpose of the article in question.

The teaching of the present disclosure provides a method and an article with superior characteristics and attributes opening a new field of applications for structural materials as well as for printing geometries efficiently and requiring much less post-processing, such as the removal of burrs and/or support structures. The articles resulting from the method of the present disclosure can also be more easily evacuated of material as the surfaces separate the volume of the article into two complete labyrinths. Essentially two small holes placed at the right spot of the article can be enough to remove by draining or blowing out the material.

REFERENCE NUMBERS 1 cell in the shape of a rhomboid
1' 2nd cell in the shape of a rhomboid
1" 3rd cell in the shape of a rhomboid
2 monotriatruncated tetrahedron A-group
2' monotriatruncated tetrahedron B-group
10 structure
11 first edge
12 second edge
13 third edge
14 fourth edge
15 fifth edge
16 sixth edge
17 seventh edge
18 eighth edge
19 ninth edge
20 tenth edge
21 eleventh edge
22 twelfth edge
23 skin
24 hyperbolical scaling
25 article shape
30.1 tetrahedron A-group
30.2 tetrahedron B-group
40 zero stress voxel
41 voxel with little positive stress (compression)
42 voxel with little negative stress (tension)
43 voxel with high positive stress (compression)
44 voxel with high negative stress (tension)
45 voxel supporting build process
46 voxel at article boundary
50 article
51 build platform
52 build supports state of the art
53 build support
54 print layer
55 contact area
56 contact area vertical delimiter
57 center of gravity ("COG") track
58 article COG at time point #1
58.1 article upper boundary at time point #1
59 article COG at time point #4
59.1 article upper boundary at time point #4
60 article COG at time point X
60.1 article upper boundary at time point X (COG to move outside contact area)
61 maximum state of the art angle for unsupported build
62 progress
A first group labyrinth
A' A-group skeleton graph
A" densified A-group skeleton graph
A'''(s) shape-following partially thinned-out A-group skeleton graph
A'''(q) load-following partially thinned-out A-group skeleton graph
A''' partially thinned-out A-group skeleton graph: unification of A'''(s) and A'''(q)
A'''(i) inner part of outermost segment of partially thinned-out A-group skeleton graph
A'''(o) outer segment of outermost segment of partially thinned-out A-group skeleton graph
A'''(m) mirrored copy of inner part of outermost segment of partially thinned-out A-group skeleton graph
A'''(x) open-ended segment of partially thinned-out A-group skeleton graph
B second group labyrinth
B' B-group skeleton graph
B" densified B-group skeleton graph
F intersection face
G 1st node face
H 2nd node face
I 3rd node face
J 4th node face
K 5th node face
L 6th node face
M minimal surface
N variable region of internal nodes
N1 first internal node (skeleton A-group)
N2 second internal node (skeleton A-group)
O low density area (upscaled skeleton graphs)
O''' low density area (thinned-out high resolution skeleton graphs)
P high density area (downscaled skeleton graphs)
P''' high density area (high resolution skeleton graphs)
S article shape analysis
Q load case analysis (FEM simulation)
b1 "trunk"
bg connection node 1st node face
bh connection node 2nd node face
bi connection node 3rd node face
bj connection node 4th node face
bk connection node 5th node face
bl connection node 6th node face

The invention claimed is:

1. A method for lightweighting of an additively manufactured article, the article comprising one or more integral article parts each with an internal structure, the method comprising:
   infilling each of the one or more integral article parts with a quasi-crystalline structure, wherein the quasi-crystalline structure is a three-dimensional quasicrystal made from two or more types of cells in the shape of rhomboids,
   wherein one or more cells are bisected with faces resulting from the bisection having a hexagonal form,
   two equal monotriatruncated tetrahedra are created from each bisected cell, each monotriatruncated tetrahedron being a tetrahedron having three of four vertices truncated and having seven faces,
   the infilling of each of the one or more integral article parts comprises a quasiperiodic minimal surface infill, an aperiodic minimal surface infill, a quasiperiodic minimal surface design structure, an aperiodic minimal surface design structure, or a combination thereof, and
   the quasi-crystalline structure of each of the one or more integral article parts is a framework for generating the infilling of the respective one or more integral article parts.

2. The method according to claim 1, further comprising creating a geometry of the quasicrystal, wherein creating the geometry of the quasicrystal comprises:
   inputting at least four primary vectors; and
   creating a number of groups of parallel planes equal to the number of primary vectors inputted,
   wherein each group of parallel planes comprises at least three parallel planes.

3. The method according to claim 2, wherein the planes in at least one of the groups of parallel planes are evenly spaced.

4. The method according to claim 2, wherein the planes in at least one of the groups of parallel planes are randomly spaced.

5. The method according to claim 2, wherein the planes in at least one of the groups of parallel planes are spaced according to a predetermined pattern.

6. The method according to claim 2, wherein at least some of the planes in at least one of the groups of parallel planes are evenly spaced, randomly spaced, spaced according to a predetermined pattern, or combinations thereof.

7. The method according to claim 1, further comprising assigning each of the monotriatruncated tetrahedrons to one of two groups A or B, such that two labyrinths A, B are formed.

8. The method according to claim 7, further comprising inserting skeleton graphs into each of the cells shaped as rhomboids such that two interleaved skeleton graphs A', B' are created spanning an entirety of the three-dimensional quasicrystal without interconnecting at any point.

9. The method according to claim 8, wherein the skeleton graphs A', B' each extend through one of the two labyrinths A, B, wherein each skeleton graph A', B' extends through one group of monotriatruncated tetrahedra.

10. The method according to claim 2, further comprising selecting a number of planes in each of the groups of parallel planes as a measure of resolution for a desired internal structure.

11. The method according to claim 10, wherein selecting the number of planes in each of the groups of parallel planes is performed individually for any part of the one or more integral article parts.

12. The method according to claim 8, further comprising scaling down skeleton graphs A', B' outside of the one or more integral article parts to create locally densified skeleton graphs A", B".

13. The method according to claim 12, wherein the quasi-crystalline structure and skeleton graphs A', B', A", B" are used to define a quasiperiodic minimal surface.

14. The method according to claim 8, wherein the quasi-crystalline structure is used to define an aperiodic minimal surface and wherein skeleton graphs A''', B''' are used to specify an adapted minimal surface after segments have been removed according to load case analysis, article shape analysis, or both.

15. The method for lightweighting an additively manufactured article according to claim 1, wherein, the method further comprises:
providing two skeleton graphs A', B' extending through one group of monotriatruncated tetrahedra each, such that two interleaved skeleton graphs A', B' are created spanning an entirety of the quasicrystal without interconnecting at any point; and
removing units and/or segments from the skeleton graphs A', B' depending on local stress/strain analysis.

16. A computer program product for preprocessing an additively manufactured article comprising one or more article parts, each with a structure, the computer program product comprising at least one non-transitory computer-readable medium including one or more instructions that, when executed by at least one processor, cause the at least one processor to:
infill each of the one or more integral article parts with a quasi-crystalline structure, wherein the quasi-crystalline structure is a three-dimensional quasicrystal made from two or more types of cells in the shape of rhomboids,
wherein one or more cells are bisected with faces resulting from the bisection have a hexagonal form,
two equal monotriatruncated tetrahedra are created from each bisected cell, each monotriatruncated tetrahedron being a tetrahedron having three of four vertices truncated and having seven faces,
the infill of each of the one or more integral article parts comprises a quasiperiodic minimal surface infill, an aperiodic minimal surface infill, a quasiperiodic minimal surface design structure, an aperiodic minimal surface design structure, or a combination thereof, and
the quasi-crystalline structure of each of the one or more integral article parts is a framework for generating the infill of the respective one or more integral article parts.

17. An additively manufactured article comprising one or more integral article parts each with a structure,
wherein the one or more integral article parts are infilled with a quasi-crystalline structure, wherein the quasi-crystalline structure is a three-dimensional quasicrystal made from two or more types of cells in the shape of rhomboids,
one or more cells are bisected with faces resulting from the bisection have a hexagonal form,
two equal monotriatruncated tetrahedra are created from each bisected cell, each monotriatruncated tetrahedron being a tetrahedron having three of four vertices truncated and having seven faces,
the infilling comprising a quasiperiodic minimal surface infill, a quasiperiodic minimal surface design structure, an aperiodic minimal surface infill, an aperiodic minimal surface design structure, or a combination thereof, and
the quasi-crystalline structure of each of the one or more integral article parts is a framework on which the infill of the respective one or more integral article parts is generated.

18. An article according to claim 17, further comprising an outer skin and an infill, wherein an essentially zero-mean-curvature surface infill touches the outer skin at an essentially perpendicular angle.

19. The article according to claim 17, further comprising low-density areas O, O''', a high-density area P''', or a combination thereof.

20. The method for lightweighting an additively manufactured article according to claim 18, the method further comprising:
superimposing the pair of skeleton graphs A', B' with a model of an article; and
scaling the pair of skeleton graphs A', B' hyperbolically to create a template for a minimal surface infill of the article based on surfaces that are minimal and equidistant between the pair of skeleton graphs A', B'.

21. The method for lightweighting an additively manufactured article according to claim 15, the method further comprising:
superimposing the pair of skeleton graphs A', B' with a model of an article; and
removing segments of the pair of skeleton graphs A', B' based on an article shape analysis, a load case analysis, or a combination thereof, resulting in adapted skeleton graphs A''', B'''.

22. The method according to claim 20, wherein the pair of skeleton graphs A', B' is provided with a high-density area P''' corresponding to a highest density required by an area of the article, a geometry of the article, or a combination thereof.

\* \* \* \* \*